(12) United States Patent
Weiss et al.

(10) Patent No.: US 11,559,129 B2
(45) Date of Patent: Jan. 24, 2023

(54) ORAL DEVICE CONTAINER AND ORAL DEVICE CONTAINER AND BOTTLE ASSEMBLY

(71) Applicant: Custom Club, Inc., Scottsdale, AZ (US)

(72) Inventors: Craig Weiss, Paradise Valley, AZ (US); Blair Feldman, Paradise Valley, AZ (US); Quinn Fitzgerald, San Francisco, CA (US); Chloe Georgiades, San Francisco, CA (US); Elliot Raderman, San Francisco, CA (US)

(73) Assignee: CUSTOM CLUB, INC., Scottsdale, AZ (US)

(*) Notice: Subject to any disclaimer, the term of this patent is extended or adjusted under 35 U.S.C. 154(b) by 0 days.

(21) Appl. No.: 17/528,463

(22) Filed: Nov. 17, 2021

(65) Prior Publication Data
US 2022/0071377 A1    Mar. 10, 2022

Related U.S. Application Data

(63) Continuation of application No. 17/192,640, filed on Mar. 4, 2021, now Pat. No. 11,185,148.
(Continued)

(51) Int. Cl.
*A45F 3/16* (2006.01)
*A63B 71/00* (2006.01)
(Continued)

(52) U.S. Cl.
CPC ............ *A45F 3/16* (2013.01); *A63B 71/0036* (2013.01); *A45F 2003/003* (2013.01);
(Continued)

(58) Field of Classification Search
CPC ....... A45F 3/16; B65D 51/28; B65D 21/0228; B65D 43/18; A61C 19/02; A63B 71/0036; A45D 40/221; Y10T 16/14; Y10T 16/5401
See application file for complete search history.

(56) References Cited

U.S. PATENT DOCUMENTS 2,214,437 A * 9/1940 Punte .................... B65D 47/263
                                                        206/536
2,358,194 A * 9/1944 White .................... A45C 11/24
                                                        206/538
(Continued)

OTHER PUBLICATIONS

International Search Report and Written Opinion dated Aug. 6, 2021, in International Application No. PCT/US2021/0211131 (19 pages).

*Primary Examiner* — Justin M Larson
(74) *Attorney, Agent, or Firm* — Bookoff McAndrews, PLLC

(57) ABSTRACT

An oral device container and bottle assembly may include a bottle having a bottle connector; and an oral device container. The oral device container may include a base portion having: a base outer wall having an opening; a base inner wall; and an oral device container connector configured to removably connect to the bottle connector. The oral device container may further include a cap portion configured to be mounted to the base portion and to rotate relative to the base portion. The cap portion may have a cap outer wall having an opening; and a cap inner wall that is received within the base inner wall.

15 Claims, 13 Drawing Sheets

Related U.S. Application Data

(60) Provisional application No. 62/986,249, filed on Mar. 6, 2020.

(51) Int. Cl.
*A63B 71/08* (2006.01)
*A45F 3/00* (2006.01)
*B65D 21/02* (2006.01)
*B65D 51/28* (2006.01)
*A61C 19/02* (2006.01)
*B65D 43/24* (2006.01)
*B65D 43/18* (2006.01)
*B65D 43/22* (2006.01)

(52) U.S. Cl.
CPC .............. *A61C 19/02* (2013.01); *A63B 71/085* (2013.01); *B65D 21/0228* (2013.01); *B65D 43/18* (2013.01); *B65D 43/22* (2013.01); *B65D 43/24* (2013.01); *B65D 51/28* (2013.01)

(56) References Cited

U.S. PATENT DOCUMENTS

| | | | |
|---|---|---|---|
| 3,125,214 A * | 3/1964 | Merila | A45C 1/02 206/0.8 |
| 3,518,988 A | 7/1970 | Gores | |
| 4,164,301 A * | 8/1979 | Thayer | B65D 83/0454 292/84 |
| 4,378,885 A * | 4/1983 | Leopoldi | B65D 83/0481 220/4.21 |
| 4,544,063 A * | 10/1985 | Neward | B65D 47/263 220/253 |
| 4,777,969 A * | 10/1988 | Holloway | A45D 33/006 206/823 |
| 4,966,319 A * | 10/1990 | Fleming | A45C 11/00 206/83 |
| 5,203,351 A * | 4/1993 | Adell | A61C 9/0026 128/859 |
| 5,397,017 A * | 3/1995 | Muza | A61J 7/0046 221/83 |
| 5,489,049 A * | 2/1996 | Robbins, III | G01F 11/262 222/456 |
| 5,611,355 A | 3/1997 | Hilsen | |
| 5,848,731 A * | 12/1998 | Deering | B65D 47/08 222/129 |
| 5,899,691 A | 5/1999 | Parker et al. | |
| 6,085,919 A * | 7/2000 | Singer | B65D 81/36 206/217 |
| 6,305,591 B1 * | 10/2001 | Jones | A45F 5/00 224/604 |
| D457,638 S * | 5/2002 | Alstad | D24/176 |
| 6,415,794 B1 | 7/2002 | Kittelsen et al. | |
| 6,505,626 B2 | 1/2003 | Kittelsen et al. | |
| 6,505,627 B2 | 1/2003 | Kittelsen et al. | |
| 6,505,628 B2 | 1/2003 | Kittelsen et al. | |
| 6,508,251 B2 | 1/2003 | Kittelsen et al. | |
| 6,510,853 B1 | 1/2003 | Kittelsen et al. | |
| 6,539,943 B1 | 4/2003 | Kittelsen et al. | |
| 6,588,430 B2 | 7/2003 | Kittelsen et al. | |
| 6,598,605 B1 | 7/2003 | Kittelsen et al. | |
| 6,626,180 B1 | 9/2003 | Kittelsen et al. | |
| 6,675,806 B2 | 1/2004 | Kittelsen et al. | |
| 6,675,807 B2 | 1/2004 | Kittelsen et al. | |
| 6,691,710 B2 | 2/2004 | Kittelsen et al. | |
| 6,831,541 B1 * | 12/2004 | Seidler | H01F 7/0263 206/818 |
| 6,961,977 B2 * | 11/2005 | Seidler | A45D 33/20 220/816 |
| 7,156,774 B2 | 1/2007 | Mohindra | |
| 7,159,720 B2 * | 1/2007 | Pearson | B65D 83/04 206/533 |
| 7,201,271 B1 * | 4/2007 | Saad | A61C 17/036 206/63.5 |
| 7,549,423 B1 | 6/2009 | Hirshberg | |
| 7,637,262 B2 | 12/2009 | Bailey | |
| 7,743,775 B2 * | 6/2010 | Thiebaut | A45D 40/24 132/294 |
| D639,439 S | 6/2011 | Raad | |
| 8,033,392 B1 * | 10/2011 | Gehner | A61L 2/26 206/83 |
| 8,033,422 B2 * | 10/2011 | Estrada | B65D 83/0454 221/89 |
| 8,074,658 B2 | 12/2011 | Kittelsen et al. | |
| 8,113,206 B2 | 2/2012 | Roettger et al. | |
| 8,156,940 B2 | 4/2012 | Lee | |
| 8,166,976 B2 | 5/2012 | Webster et al. | |
| 8,286,821 B2 * | 10/2012 | Mejia | B65D 51/28 220/521 |
| 8,567,408 B2 | 10/2013 | Roettger et al. | |
| 8,585,401 B2 | 11/2013 | Moses | |
| D717,038 S * | 11/2014 | Lee | D3/203.3 |
| 8,875,892 B1 * | 11/2014 | Warner | A44C 5/003 206/533 |
| 8,955,705 B2 * | 2/2015 | Vogel | B65D 47/265 220/253 |
| 9,346,595 B2 * | 5/2016 | Soltz | A45F 3/16 |
| 9,545,332 B2 | 1/2017 | Luco | |
| 9,655,695 B2 | 5/2017 | Ross | |
| 9,668,597 B2 * | 6/2017 | Ni | A45C 11/00 |
| 9,668,827 B2 | 6/2017 | Roettger et al. | |
| 9,681,732 B2 * | 6/2017 | Winter | A45D 33/00 |
| 9,783,346 B2 * | 10/2017 | Chourreau | B65D 43/166 |
| 9,820,882 B2 | 11/2017 | Liptak et al. | |
| 9,844,424 B2 | 12/2017 | Wu et al. | |
| 9,861,513 B2 | 1/2018 | Rayek et al. | |
| 9,896,247 B2 * | 2/2018 | Balkus | B65D 47/046 |
| D814,705 S * | 4/2018 | Norris | D9/756 |
| 9,943,386 B2 | 4/2018 | Webber et al. | |
| 9,943,991 B2 | 4/2018 | Tanugula et al. | |
| 9,949,868 B2 | 4/2018 | Kim et al. | |
| 10,144,551 B2 * | 12/2018 | Ni | B65D 51/28 |
| 10,327,572 B2 * | 6/2019 | Seidler | A47G 1/16 |
| 10,329,059 B1 * | 6/2019 | Heilman | B65D 25/04 |
| D865,180 S * | 10/2019 | Bauer | D24/176 |
| D867,163 S * | 11/2019 | Portal-Andreu | D9/738 |
| 10,588,728 B2 * | 3/2020 | Wilson | G06N 3/0454 |
| 10,638,859 B2 * | 5/2020 | Seidler | G04B 37/1473 |
| 10,661,945 B2 * | 5/2020 | Beardsell | B65D 23/04 |
| 10,772,714 B1 * | 9/2020 | Chapman | G08B 21/24 |
| D902,578 S * | 11/2020 | Bloch | D3/203.1 |
| D911,701 S * | 3/2021 | Bestel | A61L 2/26 D3/203.1 |
| 10,932,892 B2 * | 3/2021 | Harpring | A61C 19/02 |
| 11,001,487 B2 * | 5/2021 | Lyons | A47J 31/525 |
| D921,354 S * | 6/2021 | Petersen | D3/203.4 |
| D928,508 S * | 8/2021 | Lacey | D3/294 |
| D930,352 S * | 9/2021 | Jiang | D3/203.1 |
| 11,110,192 B2 * | 9/2021 | Weiss | A61L 2/10 |
| 11,147,659 B1 * | 10/2021 | Seery | B65D 51/248 |
| 11,185,148 B2 * | 11/2021 | Weiss | A45F 3/16 |
| 11,257,349 B2 * | 2/2022 | Chapman | G08B 13/1427 |
| 11,405,710 B2 * | 8/2022 | Lin | H04R 1/10 |
| 2003/0167599 A1 * | 9/2003 | Seidler | A45D 33/20 16/320 |
| 2004/0244805 A1 * | 12/2004 | Cook | B65D 43/164 128/859 |
| 2005/0092754 A1 * | 5/2005 | Marsden | A61J 7/0053 220/717 |
| 2006/0278640 A1 * | 12/2006 | Watts | B65D 51/28 220/253 |
| 2007/0197876 A1 | 8/2007 | Lane | |
| 2008/0142520 A1 * | 6/2008 | Morgan | A45F 3/16 220/254.3 |
| 2008/0149589 A1 * | 6/2008 | Lach | B65D 23/12 215/386 |
| 2008/0283422 A1 * | 11/2008 | Jansheski | B65D 43/164 206/63.5 |
| 2009/0071502 A1 * | 3/2009 | Drugeon | A45C 13/1069 132/293 |
| 2009/0308873 A1 * | 12/2009 | Kim | B65D 51/28 220/524 |

(56) References Cited

U.S. PATENT DOCUMENTS

| | | | |
|---|---|---|---|
| 2010/0163507 A1* | 7/2010 | Morgan | B65D 23/0885 220/524 |
| 2010/0275930 A1 | 11/2010 | Evans | |
| 2011/0036803 A1 | 2/2011 | Mejia | |
| 2011/0057003 A1* | 3/2011 | Wysocki | A45C 11/00 224/222 |
| 2012/0067769 A1* | 3/2012 | Rein | B65D 51/28 220/23.88 |
| 2012/0152771 A1* | 6/2012 | Garside | A45F 3/16 206/223 |
| 2013/0118507 A1 | 5/2013 | Chappuis | |
| 2013/0221046 A1* | 8/2013 | Wysocki | A45F 5/00 224/222 |
| 2013/0319966 A1 | 12/2013 | Lane | |
| 2014/0000633 A1 | 1/2014 | Hernandez | |
| 2014/0069441 A1 | 3/2014 | Moses | |
| 2014/0271948 A1 | 9/2014 | LoPesio | |
| 2015/0075540 A1 | 3/2015 | Dye | |
| 2015/0136624 A1* | 5/2015 | Konig | A46B 15/0091 206/63.5 |
| 2015/0272773 A1 | 10/2015 | Rico et al. | |
| 2015/0305919 A1 | 10/2015 | Stubbs et al. | |
| 2016/0100924 A1* | 4/2016 | Wilson | A63B 71/085 206/63.5 |
| 2016/0120619 A1 | 5/2016 | Bons | |
| 2016/0280447 A1 | 9/2016 | Beardsell | |
| 2017/0000643 A1 | 1/2017 | Gelb et al. | |
| 2017/0014262 A1 | 1/2017 | Dietz | |
| 2017/0020716 A1 | 1/2017 | Hart et al. | |
| 2017/0088331 A1* | 3/2017 | Williams | F24V 30/00 |
| 2017/0120135 A1 | 5/2017 | Engel et al. | |
| 2017/0202644 A1 | 7/2017 | Ross | |
| 2017/0245624 A1* | 8/2017 | Neves | A45F 3/18 |
| 2017/0282451 A1 | 10/2017 | Layzell et al. | |
| 2018/0000231 A1* | 1/2018 | Trubey | B65D 81/22 |
| 2018/0000564 A1 | 1/2018 | Cam et al. | |
| 2018/0042818 A1 | 2/2018 | Reed | |
| 2018/0071135 A1 | 3/2018 | Ingemarsson-Matzen | |
| 2018/0071420 A1* | 3/2018 | Bestel | A61L 2/26 |
| 2018/0133581 A1 | 5/2018 | Segal | |
| 2018/0140120 A1* | 5/2018 | Shackelford | A47G 19/2272 |
| 2018/0193182 A1 | 7/2018 | Wiffen | |
| 2018/0193183 A1 | 7/2018 | Kim et al. | |
| 2018/0207020 A1 | 7/2018 | Hart et al. | |
| 2019/0021473 A1* | 1/2019 | Prewitt | A61C 17/036 |
| 2019/0021901 A1 | 1/2019 | LeBlanc et al. | |
| 2019/0029469 A1* | 1/2019 | Jones | A45F 3/20 |
| 2019/0104788 A1* | 4/2019 | Hughes | A63B 71/0036 |
| 2019/0105144 A1* | 4/2019 | Buenrostro | A45F 5/004 |
| 2019/0344150 A1 | 11/2019 | Dreve | |
| 2019/0352065 A1* | 11/2019 | Pham | B65D 83/04 |
| 2020/0179092 A1 | 6/2020 | Eisenberger | A61C 7/08 |
| 2020/0275764 A1* | 9/2020 | King | A45F 3/16 |
| 2021/0086975 A1 | 3/2021 | Strominger | B65D 51/28 |
| 2021/0100333 A1* | 4/2021 | Seidler | A45C 13/1069 |
| 2021/0259627 A1* | 8/2021 | Lee | A61B 5/682 |
| 2021/0274915 A1* | 9/2021 | Weiss | A45F 3/16 |
| 2021/0379228 A1* | 12/2021 | Weiss | A45D 44/20 |
| 2022/0071377 A1* | 3/2022 | Weiss | A63B 71/0036 |

\* cited by examiner

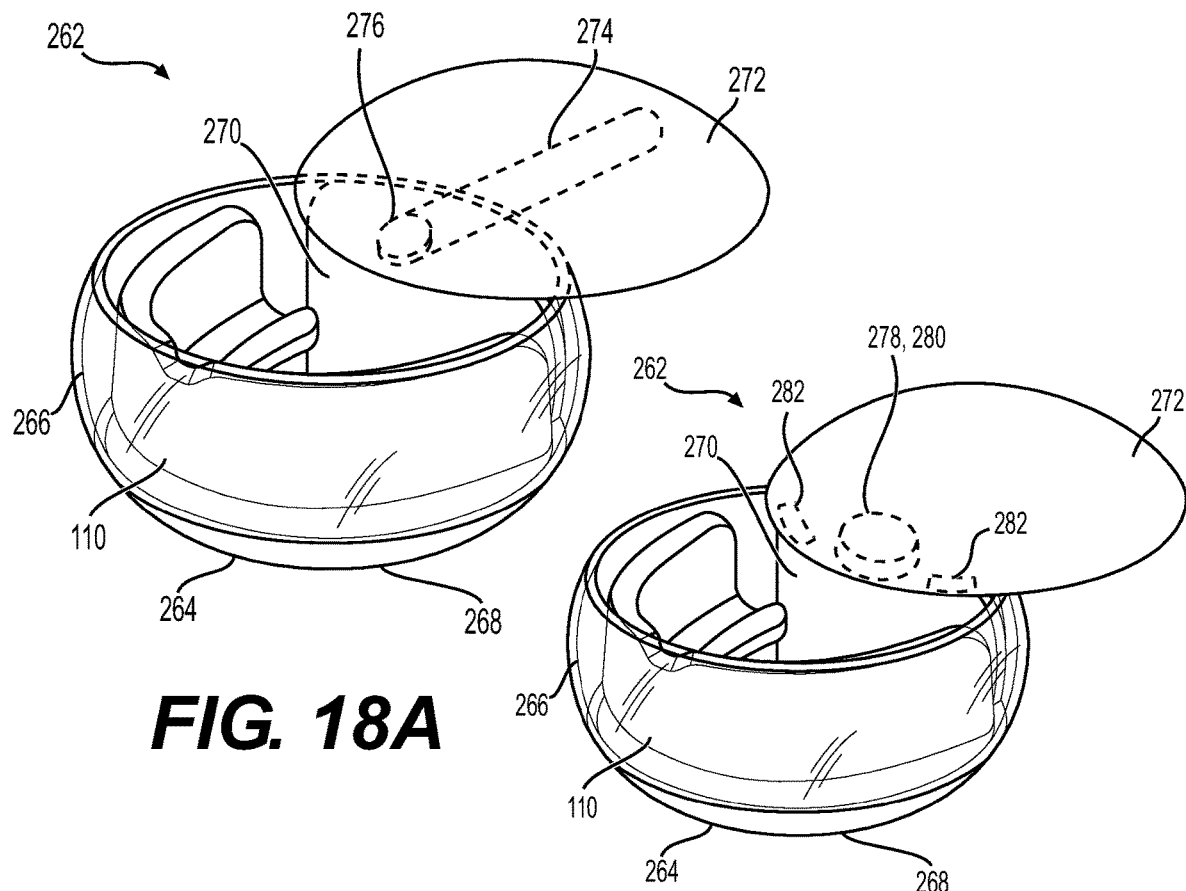
FIG. 18A
FIG. 18B
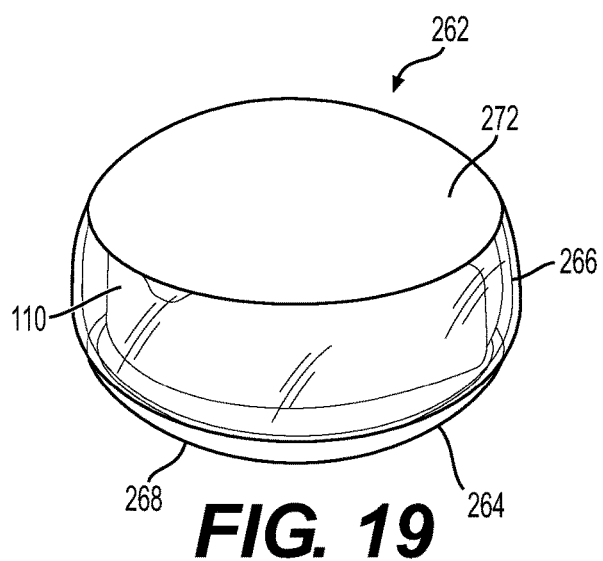
FIG. 19

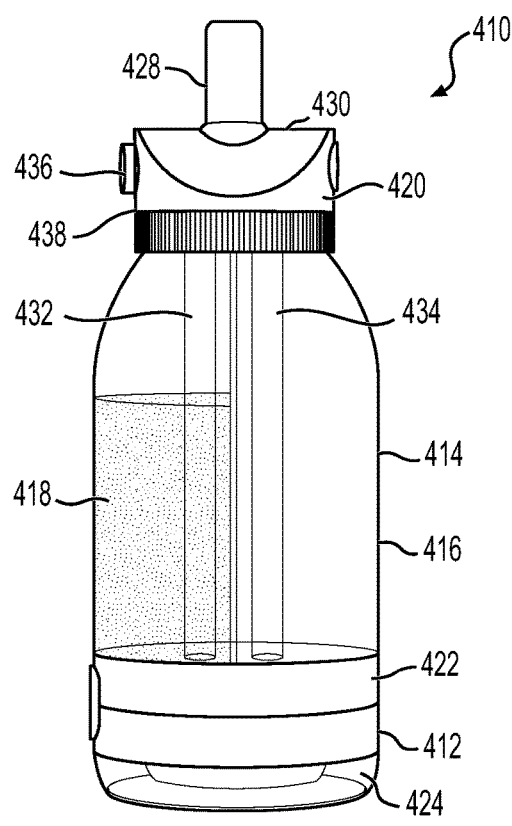
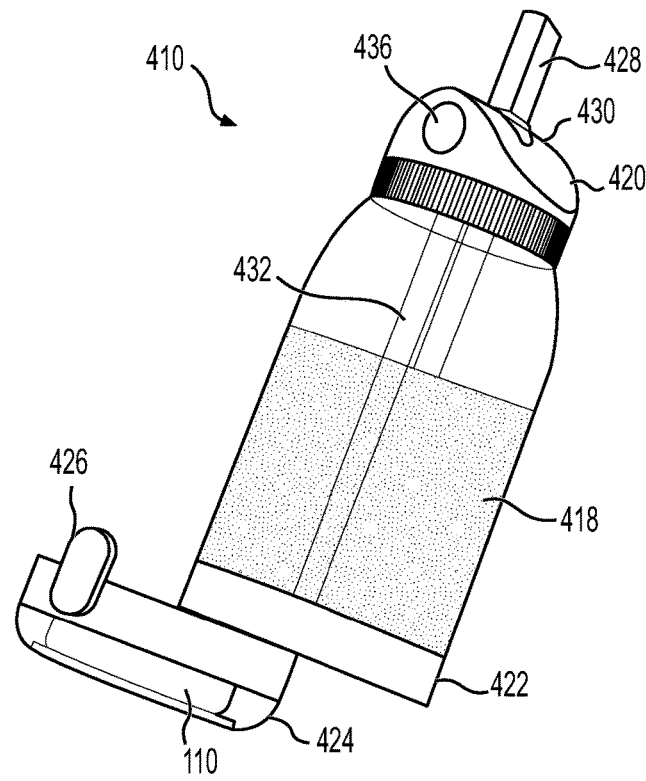
FIG. 34  FIG. 35

ORAL DEVICE CONTAINER AND ORAL DEVICE CONTAINER AND BOTTLE ASSEMBLY

CROSS-REFERENCE TO RELATED APPLICATION

This application is a continuation of U.S. Nonprovisional application Ser. No. 17/192,640, filed on Mar. 4, 2021, which claims the benefit of priority from U.S. Provisional Application No. 62/986,249, filed on Mar. 6, 2020, the entireties of each of which are incorporated herein by reference.

TECHNICAL FIELD

The present disclosure relates generally to a container for an oral device, such as a mouthguard or a retainer, and a container and bottle assembly.

BACKGROUND

Oral devices, such as mouthguards, are used by individuals to protect at least their teeth, upper jaw (maxilla), and lower jaw (mandible) from injury during athletic events. Cases or containers for mouthguards are used to store and protect the mouthguard when not in use. Typically, users remove mouthguards from their mouths during breaks in order to consume water or a sports drink. As mouthguard containers may be relatively small and stored within a sports bag, it may be difficult to locate the container quickly. There is a need, therefore, for a convenient, easy to access mouthguard container.

The oral device container and oral device container and bottle assembly of the present disclosure may solve one or more of the problems set forth above and/or other problems in the art. The scope of the current disclosure, however, is defined by the attached claims, and not by the ability to solve any specific problem.

SUMMARY

In one aspect of the disclosure, an oral device container and bottle assembly may include a bottle having a bottle connector; and an oral device container. The oral device container may include a base portion having: a base outer wall having an opening; a base inner wall; and an oral device container connector configured to removably connect to the bottle connector. The oral device container may further include a cap portion configured to be mounted to the base portion and to rotate relative to the base portion. The cap portion may have a cap outer wall having an opening; and a cap inner wall that is received within the base inner wall.

In a further aspect of the disclosure, an oral device container and bottle assembly may include a bottle having a bottle connector; and an oral device container. The oral device container may include a C-shaped base portion having: a bottom portion; a side wall extending from one side of the bottom portion; a top portion extending from the side wall; and a base mounting portion extending from an upper surface of the bottom portion. The bottom portion, the side wall, and the top portion may define a C-shaped recess. The oral device container may further include a cap portion configured to be movably mounted to the base portion. The cap portion may have a complementary C-shape configured to fit within the C-shaped recess, and the cap portion may have a cap portion connector configured to connect to the base mounting portion.

In another aspect of the disclosure, an oral device container and bottle assembly may include a bottle having a bottle connector; and an oral device container. The oral device container may include a base portion having: a bottom portion; a side wall extending from one side of the bottom portion; and a top portion slidably mounted to the side wall. The bottom portion, the side wall, and the top portion may define a ring-shaped recess. The oral device container may further include a cap portion configured to be mounted to the base portion. The cap portion may have a complementary ring shape to fit around the ring-shaped recess of the base portion.

BRIEF DESCRIPTION OF THE DRAWINGS

FIGS. 18A and 18B show schematic isometric views of sliding and rotating cap portions of oral device containers, respectively, shown in open states, according to still other embodiments of the disclosure.

FIG. 19 shows a schematic isometric view of the cap portions of oral device containers shown in FIGS. 18A and 18B, with the cap portions in a closed state.

FIG. 34 is a schematic isometric view of an oral device container and bottle assembly according to still another embodiment of the disclosure.

FIG. 35 is a schematic isometric view of the oral device container and bottle assembly shown in FIG. 34 in an open state.

DETAILED DESCRIPTION

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1:
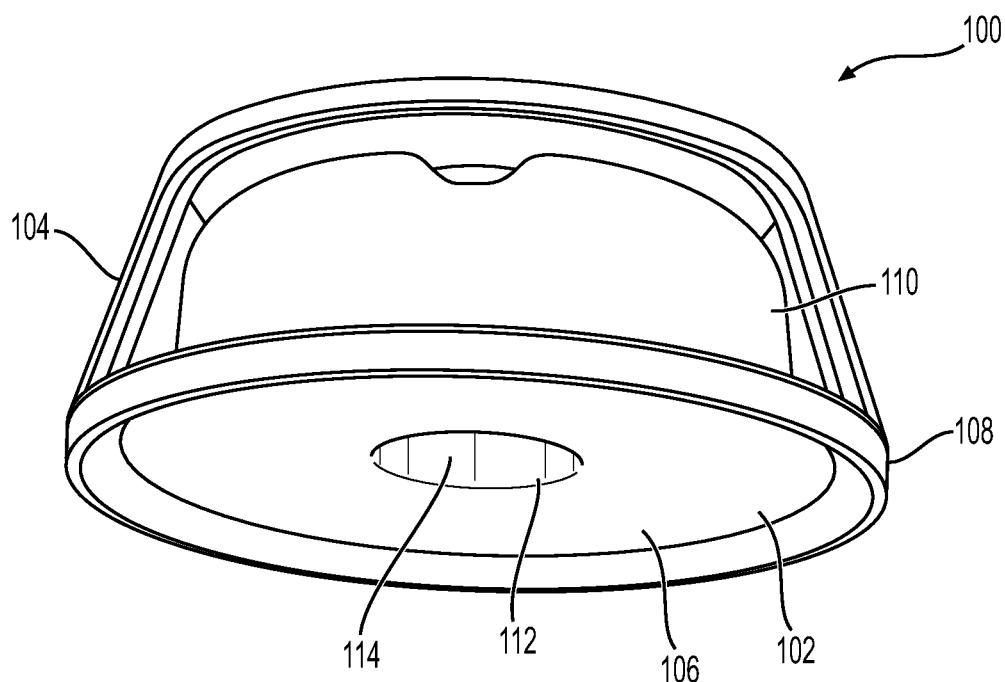
FIG. 1 shows a schematic isometric view of an oral device container according to an embodiment of the disclosure.

FIG. 1 shows a schematic isometric view of an oral device container 100 according to an embodiment of the disclosure. The oral device container 100 has a base portion 102 and a cap portion 104. The base portion 102 and the cap portion 104 may be formed of polycarbonate. The material that forms the base portion 102 and the cap portion 104 is not, however, limited to this material, and it is contemplated that base portion 102 and cap portion 104 may be formed of a variety of materials, and base portion 102 and cap portion 104 may be formed of the same or different materials.

Figure 2:
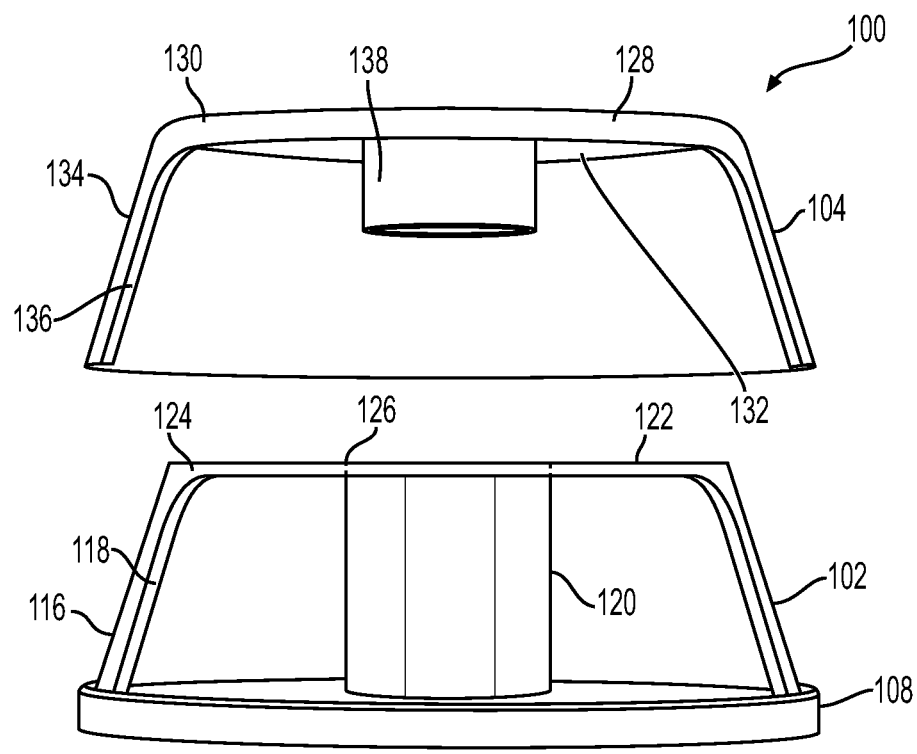
FIG. 2 shows an exploded side view of the oral device container shown in FIG. 1.

The base portion 102 has a base plate 106 having a circular outer edge 108 and a circular inner edge 112 defining a central through-hole 114. As will be described in further detail below, the oral device container 100 may be configured for receipt of an oral device 110 therein. FIG. 2 shows an exploded side view of the oral device container 100 shown in FIG. 1. As shown in FIG. 2, the base portion 102 also has a circular base outer wall 116 that extends from the outer edge 108 and tapers inward towards a top end thereof. The base outer wall 116 has an opening 118, which may extend (or encompass) approximately one-third of a circumference of the outer edge 108 of the base plate 106. In addition, the base portion 102 has a circular base inner wall 120 that extends from the inner edge 112 and forms an internal column or cylinder between a top plate 122, described below, and the base plate 106. The base portion 102 also has the top plate 122 having a circular outer edge 124 that extends from the base outer wall 116, and a circular inner edge 126 that extends from the base inner wall 120. The cap portion 104 has a top plate 128 having a circular outer edge 130 and a bottom surface 132. A cap outer wall 134 extends from the outer edge 130 and tapers from a lower end thereof to an upper end thereof. The cap outer wall 134 has an opening 136, which may extend (or encompass) approximately one-third of a circumference of the outer edge 130 of the top plate 128. In some examples, the opening 136 may have a size approximately equal to a size of the opening 118. That is, a height of the opening 118 may be approximately equal to a height of the opening 136, and a width of the opening 118 may be approximately equal to a width of the opening 136. In some examples, the opening 118 and the opening 136 may each be sized to accommodate passage of the oral device 110 therethrough, as will be described in further detail below. In addition, the cap portion 104 has a cap inner wall 138 extending from the bottom surface 132. As shown in FIG. 2, the cap inner wall 138 may form a cylindrical structure depending from the bottom surface 132 and having a length less than a length between the bottom surface 132 and a bottom of cap portion 104.

Figure 3:
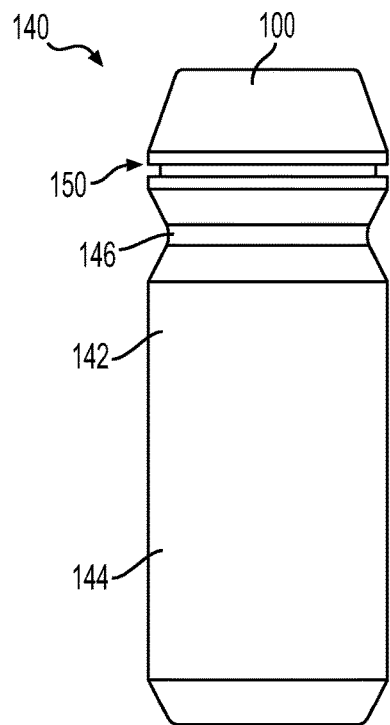
FIG. 3 shows a schematic side view of an oral device container and bottle assembly, including the oral device container shown in FIG. 1, according to an embodiment of the disclosure.
Figure 4:
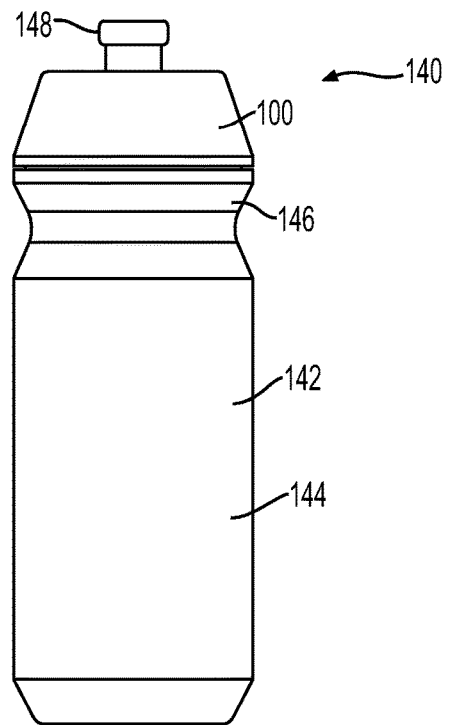
FIG. 4 shows a schematic side view of the oral device container and bottle assembly shown in FIG. 3, with a nozzle in an extended state.

When the cap portion 104 is mounted to the base portion 102, the cap inner wall 138 is inserted and positioned within the internal column formed by the base inner wall 120. Accordingly, an inner diameter of the base inner wall 120 is greater than an outer diameter of the cap inner wall 138. The cap portion 104 is rotatable relative to the base portion 102. As such, rotation of the cap portion 104 relative to the base portion 102 toward a first configuration (as shown in FIG. 1) may result in alignment between opening 118 and opening 136. Such alignment may permit a user to insert an oral device 110 into container 100 or to remove the oral device 110 from the container 100, as needed or desired. Additionally, rotation of the cap portion 104 relative to the base portion 102 towards a second configuration (as shown in FIGS. 3 and 4), may result in misalignment between opening 118 and opening 136. Such misalignment may prevent or inhibit a user from inserting an oral device 110 into container 100 or removing the oral device 110 from the container 100, as needed or desired. Additionally, it is understood that the second configuration may include a situation where opening 118 and opening 136 do not overlap, thereby forming a closed container 100. As such, in a closed configuration, an oral device 110 positioned within the container 100 may be prevented from contamination with an external environment.

FIG. 3 shows a schematic side view of an oral device container and bottle assembly 140, including the oral device container 100 and a bottle 142. The bottle 142 may include a base portion 144 and a cap portion 146. The base portion 144 and the cap portion 146 may be formed of polycarbonate. The material that forms the base portion 144 and the cap portion 146 is not, however, limited to this material, and it is contemplated that base portion 144 and cap portion 146 may be formed of a variety of materials, and base portion 144 and cap portion 146 may be formed of the same or different materials. The oral device container 100 is removably attached to the cap portion 146, and the cap portion 146 may be removably attached to the base portion 144. For example, the container 100 may be attached to the cap portion 146 in any appropriate manner (e.g., a threaded connection, complimentary shaped engagement features, a hinge, or the like). FIG. 4 is a schematic side view of the oral device container and bottle assembly 140 shown in FIG. 3, with a nozzle 148 in an extended state. The nozzle 148 may be formed of Food Safe thermoplastic elastomer (TPE), Food Safe silicone, or other appropriate material. The material that forms the nozzle 148 is not, however, limited to such materials. In the embodiment shown in FIGS. 3 and 4, the nozzle 148 is spring loaded within the cap portion 146 of the bottle 142. When the oral device container 100 is attached to the cap portion 146, a gap 150 is formed between the outer edge 108 of the base portion 102 of the oral device container 100 and the cap portion 146 of the bottle 142, as shown in FIG. 3. When the oral device container 100 is pressed downward toward the cap portion 146, the gap 150 is closed (e.g., partially or entirely closed), as shown in FIG. 4, and, due to the spring-loaded configuration of the assembly, the nozzle 148 is forced upwards (e.g., "pops" up) so as to extend through the oral device container 100 (e.g., through base inner wall 120 and cap inner wall 138) for access by a user. Prior to depressing the oral device container 100 toward the cap portion 146, it is noted that an uppermost surface (e.g., tip) of the nozzle 148 may be aligned so as to be flush with top plate 128, or optionally, nozzle 148 may be recessed below the top plate 128 and located within cap inner wall 138 or base inner wall 120. Once the nozzle 148 is in the extended state, pulling the container 100 away from the bottle 142 returns the nozzle 148 to the non-extended state.

Figure 5:
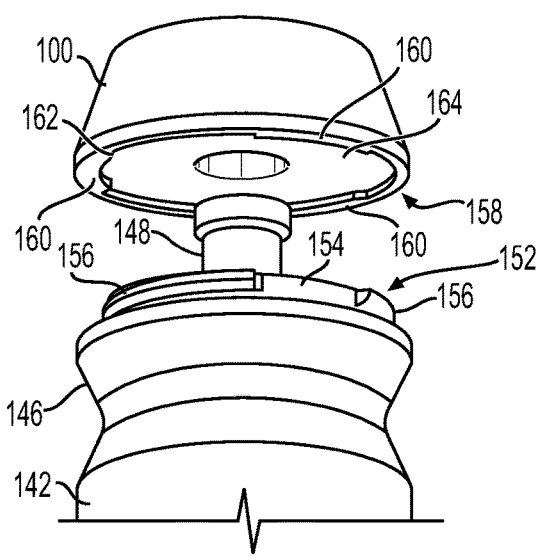
FIG. 5 shows a detail view of the oral device container and bottle assembly shown in FIG. 3.

FIG. 5 shows a detail view of the oral device container and bottle assembly 140 shown in FIGS. 3 and 4, with the oral device container 100 detached from the cap portion 146 of the bottle 142. As shown in FIG. 5, the bottle 142 has a bottle connector 152 that includes a circular mounting portion 154 and a plurality of connector threads or tabs 156. The plurality of connector tabs 156 are provided on a circumferential edge of the mounting portion 154, and may be evenly spaced thereon. The plurality of connector tabs 156 extend radially outward from the circumferential edge of the mounting portion 154. Additionally, the oral device container 100 has an oral device container connector 158 that includes a plurality of connector threads or tabs 160. The plurality of connector tabs 160 are provided on a circumferential edge 162 of a bottom surface 164 of the base plate 106, and may be evenly spaced around the circumferential edge 162. The plurality of connector tabs 160 extend radially inward from the circumferential edge 162. When the oral device container 100 is connected to the bottle 142, the plurality of connector tabs 160 on the base plate 106 of the oral device container 100 interlock with the plurality of connector tabs 156 on the mounting portion 154 of the bottle 142. That is, the plurality of connector tabs 156 on the mounting portion 154 of the bottle 142 may be received within spaces between the connector tabs 160 on the base plate 106 of the oral device container 100. Then, when the bottle 142 and the oral device container 100 are rotated relative to each other in a first direction (e.g., clock-wise) by, for example, 90°, the connector tabs 156 on the mounting portion 154 of the bottle 142 slide into a space between the connector tabs 160 on the base plate 106 and the bottom surface 164 of the base plate 106 so as to engage and secure the oral device container 100 relative to the bottle 142. Upon rotation of the oral device container 100 relative to the bottle 142 in a second direction (e.g., counter clock-wise), opposite the first direction, connector tabs 156 may move out of engagement with connector tabs 160 so as to permit or enable separation of oral device container 100 from bottle 142. In this manner, the oral device container 100 may be removably attached to the bottle 142.

Figure 6:
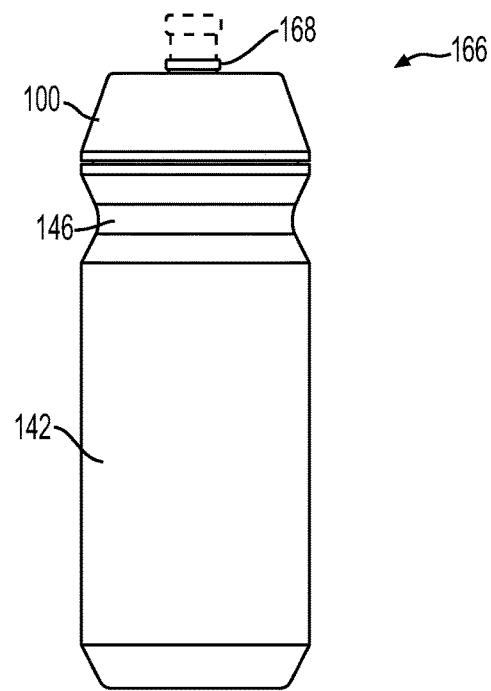
FIG. 6 shows a schematic side view of an oral device container and bottle assembly according to an embodiment of the disclosure.

FIG. 6 shows an oral device container and bottle assembly 166 that is similar to the oral device container and bottle assembly 140 shown in FIGS. 3 and 4. The oral device container and bottle assembly 166 differs from the oral device container and bottle assembly 140 shown in FIGS. 3 and 4 in that a nozzle 168 slightly protrudes from the oral device container 100 in a recessed state, and is configured to be pulled up (e.g., manually by the user) to protrude further from the oral device container 100. That is, in contrast to the nozzle 148 of the oral device container and bottle assembly 140 shown in FIGS. 3 and 4, the nozzle 168 is not spring loaded, and slightly protrudes from the oral device container 100 when in the recessed state so as to enable a user to grasp the nozzle 168 and apply a force (e.g., a pulling or tension force) on the nozzle 168 to extend the nozzle 168. In addition, in contrast to the oral device container and bottle assembly 140 shown in FIGS. 3 and 4, the oral device container and bottle assembly 166 shown in FIG. 6 does not include a gap 150 between the oral device container 100 and the cap portion 146 of the bottle 142.

In the embodiments shown in FIGS. 3-6, the top plate 128 of the cap portion 104 has a central opening defining a through-hole that extends through the cap inner wall 138. The nozzle 148 of the bottle 142 shown in FIGS. 3-5, and the nozzle 168 of the bottle 142 shown in FIG. 6 extend through the through-hole in the cap portion 104.

Figure 7:
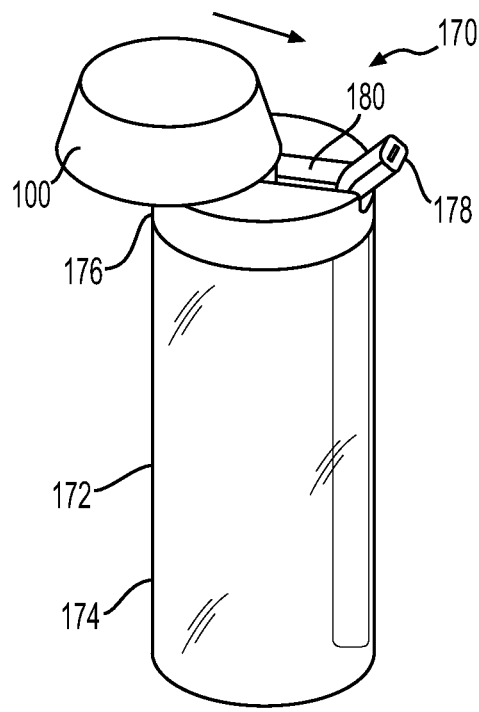
FIG. 7 shows a schematic isometric view of an oral device container and bottle assembly according to an embodiment of the disclosure.
Figure 8:
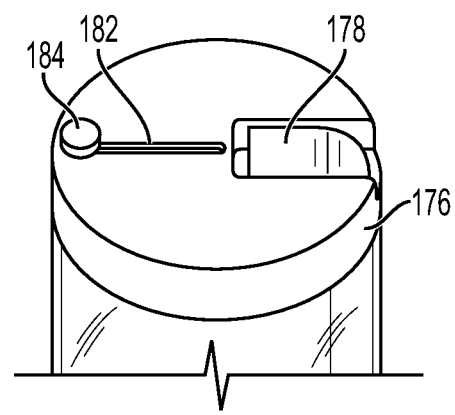
FIG. 8 shows a detail view of a cap of a bottle of the oral device container and bottle assembly shown in FIG. 7.

FIG. 7 shows a schematic isometric view of an oral device container and bottle assembly 170 according to another embodiment. The oral device container and bottle assembly 170 includes the oral device container 100, shown in FIGS. 1 and 2, and a bottle 172. The bottle 172 may have a base portion 174 and a cap portion 176 removably attached to the base portion 174. The base portion 174 may be formed of polycarbonate, and the cap portion 176 may be formed of polycarbonate. The materials that form the base portion 174 and the cap portion 176 are not, however, limited to such materials. The oral device container 100 is configured to translate (e.g., slide) relative to the bottle 172, in a first direction (e.g., a direction away from a nozzle 178). The nozzle 178 may be configured to pivot, rotate, or otherwise deflect so as to exit from a recess 180 in the cap portion 176. The nozzle 178 may be flexible to bend into and out of the recess 180, or the nozzle 178 may be mounted to a mechanical pivot (unshown). The nozzle 178 may be formed of an elastomer, such as TPE, or silicone, including, for example, food safe TPE or silicone. The material that forms the nozzle 178 is not, however, limited to such materials. FIG. 8 shows a detail view of the cap portion 176 of the bottle 172 shown in FIG. 7. The cap portion 176 includes another recess 182 and a protrusion 184 that protrudes from and slides within and/or along the recess 182. The protrusion 184 is shaped to fit a complementary shaped recess (not shown) on the bottom surface of the bottom plate 106 of the oral device container 100, so that the oral device container 100 slides relative to the cap portion 176 when attached to the bottle 172. That is, the oral device container 100 slides with the protrusion 184 in a track formed by the recess 182. Upon translating the oral device container 100 relative to the cap portion 176, the nozzle 178, due to its material, bias, or configuration, may automatically pivot so as to extend outward for use by the user (e.g., to enable the user to drink a beverage contained within the bottle 172). To close, a user may fold or otherwise direct the nozzle 178 into the recess 180 (e.g., as shown in FIG. 8) and translate (e.g., slide) the oral device container 100 in a direction opposite that of the first direction (e.g., toward the nozzle 178, as shown by the arrow in FIG. 7).

Figure 9:
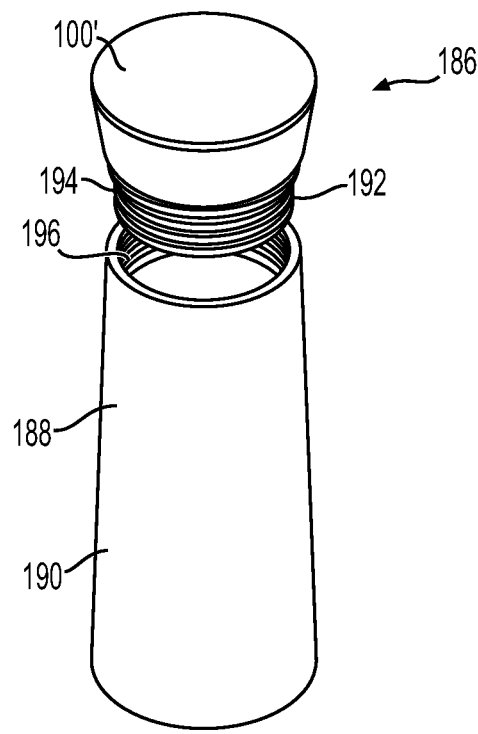
FIG. 9 shows a schematic isometric view of an oral device container and bottle assembly according to an embodiment of the disclosure.
Figure 10:
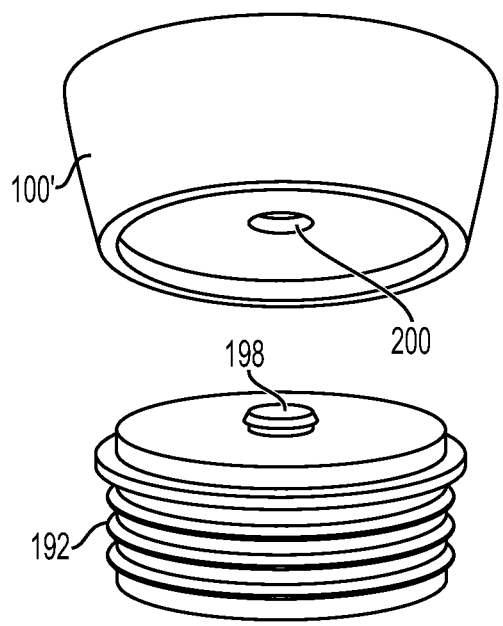
FIG. 10 shows a detail view of a cap of a bottle and an oral device container of the oral device container and bottle assembly shown in FIG. 9.

FIG. 9 shows a schematic isometric view of an oral device container and bottle assembly 186 according to another embodiment. The oral device container and bottle assembly 186 includes a modified oral device container 100' and a bottle 188. The modified oral device container 100' is generally the same as the oral device container 100, but differs in that the sidewalls of the base portion and the cap portion taper from upper ends thereof to lower ends thereof. The bottle 188 may have a base portion 190 and a cap portion 192. The base portion 190 and the cap portion 192 may be formed of polycarbonate. The base portion 190 and the cap portion 192 are not, however, limited to such a material. The cap portion 192 has one or a plurality of threads 194 configured to engage with one or a plurality of threads 196 on an inner surface of the base portion 190. That is, the cap portion 192 is configured to be threadably coupled to the base portion 190. FIG. 10 shows a detail view of the cap portion 192 of the bottle 188 and the oral device container 100. The cap portion 192 has a protrusion 198 on an upper surface thereof, and the oral device container 100 has a complementary shaped recess 200 on a bottom surface thereof. The protrusion 198 is sized so as to snap fit within the recess 200 on the oral device container 100. The snap fit between the protrusion 198 and the recess 200 allows the oral device container 100 to be easily and quickly removed from the cap portion 192.

Figure 11:
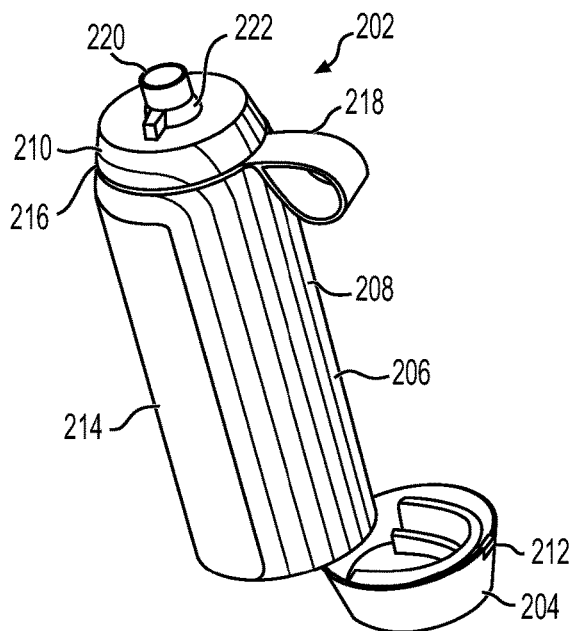
FIG. 11 shows a schematic isometric view of an oral device container and bottle assembly according to another embodiment of the disclosure.

FIG. 11 shows a schematic isometric view of an oral device container and bottle assembly 202 according to another embodiment. The oral device container and bottle assembly 202 includes an oral device container 204 and a bottle 206. The bottle 206 may include a base portion 208 and a cap portion 210. The base portion 208 and the cap portion 210 may be formed of polycarbonate. The material that forms the base portion 208 and the cap portion 210 is not, however, limited to this material, and it is contemplated that base portion 208, cap portion 210, or both may be formed of different materials. The oral device container 204 is removably and/or movably attached to a bottom surface of the base portion 208. For example, the oral device container 204 may be attached to the base portion 208 via complementary shaped engagement features, a hinge, or another appropriate mechanism. In the embodiment shown in FIG. 11, the oral device container 204 may include a button 212 on an exterior surface thereof, which forms part of a latch mechanism used to secure the oral device container 204 to the base portion 208 of the bottle 206, until the button 212 is pressed, e.g., inward, up, down, or to the side, to release the latch mechanism. When the latch mechanism is released, the oral device container 204 may swing, slide, rotate, or otherwise move relative to the base portion 208 of the bottle 206, to the position shown in FIG. 11. By virtue of this arrangement, an oral device 110 or another item, e.g., keys, key fobs, money, etc., can be securely stored within the oral device container 204. It is understood that in some arrangements, oral device container 204 may be completely separated from base portion 208, while in other arrangements, complete separation is not necessary. For example, in some arrangements, oral device container 204 may remain coupled but movable relative to base portion 208 such that oral device container 204 may be "opened" to permit oral device 110 or another item to be received within oral device container 204 without requiring complete uncoupling of oral device container 204 from base portion 208. Such coupling arrangements may include a hinge, pivot, swivel, or the like.

The base portion 208 of the bottle 206 may have a window portion 214, formed of a translucent material, which allows a user to easily see an amount of fluid contained within the bottle 206. Between the base portion 208 and the cap portion 210 of the bottle 206, a sealing member 216, formed of a material such as silicone, is provided, which may be in the shape of a ring. The sealing member 216 may include a handle portion 218, which extends outward from the ring between the base portion 208 and the cap portion 210, although handle portion 218 may be located in any upper region of bottle 206. The cap portion 210 has a nozzle 220 extending from, e.g., a center region of an upper surface thereof, and through which fluid contained within the bottle 206 can pass. In other aspects, nozzle 220 may extend from a peripheral region of the upper surface of cap portion 210.

The cap portion 210 may also include a lock 222, provided around a base of the nozzle 220, and configured to rotate around the nozzle to open and to close an opening in the base of the nozzle. When the lock 222 is engaged, fluid may be impeded from passing through the nozzle 220, and when the lock 222 is disengaged, fluid may freely pass through the nozzle 220.

Figure 12:
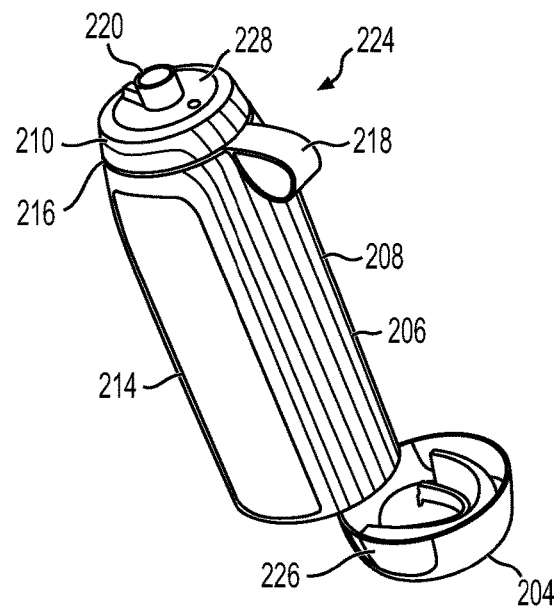
FIG. 12 shows a schematic isometric view of an oral device container and bottle assembly according to yet another embodiment of the disclosure.

FIG. 12 shows a schematic isometric view of an oral device container and bottle assembly 224 according to yet another embodiment. The oral device container and bottle assembly 224 is similar to the assembly 202 shown in FIG. 11, but differs from the assembly 202 shown in FIG. 11 in that the oral device container 204 may also include a window portion 226, which allows a user to see the contents, if any, of the oral device container 204. In addition, the embodiment shown in FIG. 12 differs from that shown in FIG. 11 in that the cap portion 210 includes a lock 228 provided on an upper surface of the cap portion 210 and around a base of the nozzle 220. The lock 228 differs from the lock 222 in shape and arrangement on the cap portion 210. That is, the lock 228 is a planar circular component mounted on the upper surface of the cap portion 210. The lock 228 is configured to rotate around a base of the nozzle 220 to open and to close an opening in the base of the nozzle 220. When the lock 228 is engaged, fluid is impeded from passing through the nozzle 220, and when the lock 228 is disengaged, fluid can freely pass through the nozzle 220.

Figure 13:
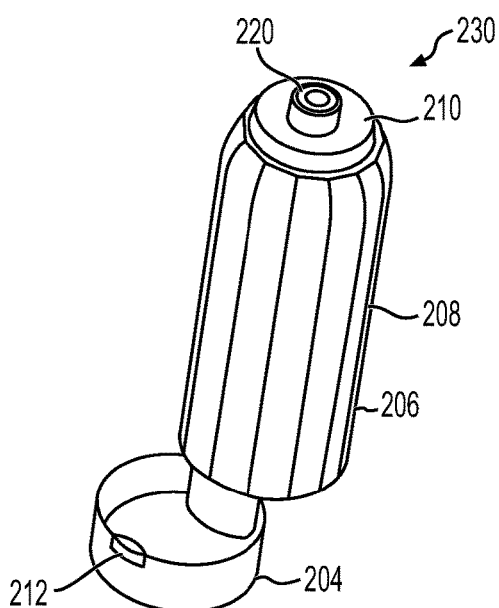
FIG. 13 shows a schematic isometric view of an oral device container and bottle assembly according to still another embodiment of the disclosure.

FIG. 13 shows a schematic isometric view of an oral device container and bottle assembly 230 according to yet another embodiment. The oral device container and bottle assembly 230 is similar to the assembly 202 shown in FIG. 11, but differs from the assembly 202 shown in FIG. 11 in that the oral device container 204 may be formed entirely of a translucent material, such as a TPE, which allows a user to see the contents, if any, of the oral device container 204.

Figure 14:
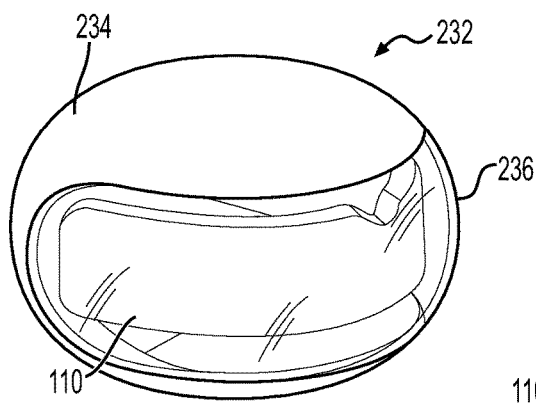
FIG. 14 shows a schematic isometric view of an oral device container according to another embodiment of the disclosure.
Figure 15:
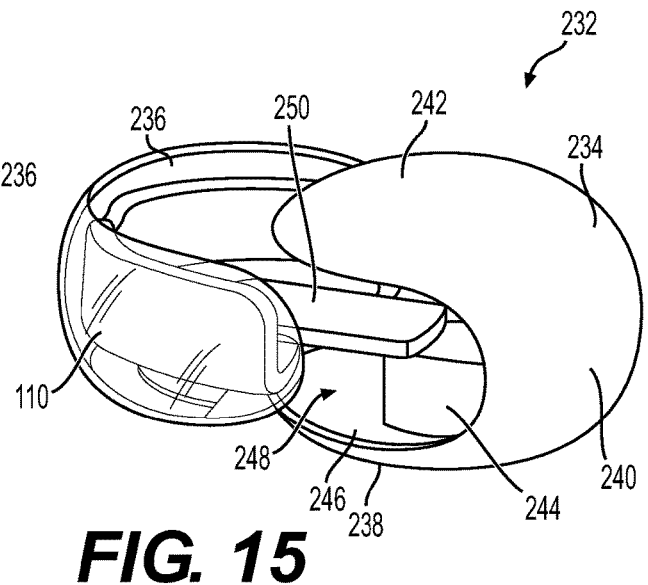
FIG. 15 shows a schematic isometric view of the oral device container shown in FIG. 14, with a cap portion in an extended state.

FIG. 14 shows a schematic isometric view of an oral device container 232 according to another embodiment. The oral device container 232 has a C-shaped base portion 234 and a cap portion 236 configured to be movably mounted onto the base portion 234. In one example, an overall height of the oral device container 232 may be approximately 33 mm, and an overall diameter of the oral device container 232 may be approximately 77 mm. The base portion 234 and the cap portion 236 may be formed of polycarbonate, for example. The material that forms the base portion 234 and the cap portion 236 is not, however, limited to this material, and it is contemplated that base portion 234 and cap portion 236 may be formed of a variety of materials, and base portion 234 and cap portion 236 may be formed of the same or different materials. The cap portion 236 may be transparent or may have a transparent portion, such that a user can see whether the oral device container 232 contains an oral device 110. FIG. 15 shows the cap portion 236 in an extended state. As shown in FIG. 15, the base portion 234 has a bottom portion 238, a side wall 240 that extends from a side of the bottom portion 238, and a top portion 242 that extends from the side wall 240. The base portion 234 also has a base mounting portion 244 extending from an upper surface 246 of the bottom portion 238. The bottom portion 238, the side wall 240, and the top portion 242 collectively define a C-shaped recess 248. The cap portion 236 has a complementary C-shape to fit within the C-shaped recess 248 of the base portion 234, as shown in FIG. 14. The cap portion 236 also has a connector 250 that moveably connects the cap portion 236 to the base portion 234. In the embodiment shown in FIG. 15, the connector 250 is a tray configured to translate (e.g., slide) relative to the mounting portion 244. The tray slides from a withdrawn position, shown in FIG. 14, to an extended position, shown in FIG. 15, to open to the oral device container 232. The mounting portion 244 and the connector 250 may form a spring-loaded mechanism, with the mounting portion 244 containing a spring (unshown) that urges the connector 250, and, therefore, the cap portion 236, into or out of the recess 248.

Figure 16:
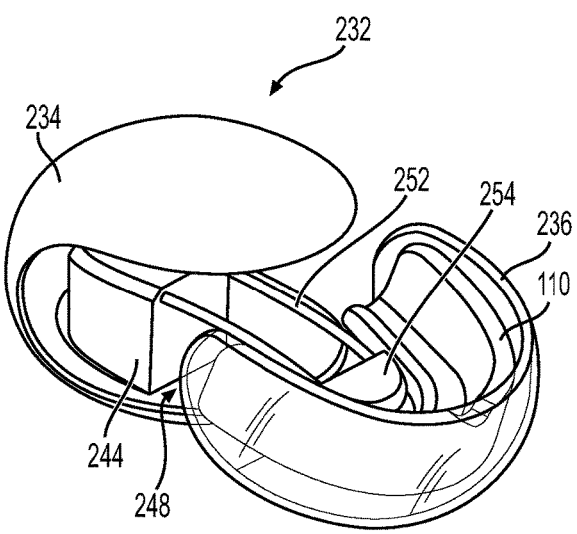
FIG. 16 shows a schematic isometric view of an oral device container according to another embodiment of the disclosure.

FIG. 16 shows another embodiment of the oral device container 232 configured to hold oral device 110. In this embodiment, the mounting portion 244 may retain a cord 252 that is connected to a connector 254 of the cap portion 236. The cord 252 may be, for example, an elastic member that can be stretched by pulling the cap portion 236 away from the base portion 234. The elasticity of the cord 252 causes the cord 252 to urge the cap portion 236 into the recess 248. Alternatively, the cord 252 may be retractable into the mounting portion 244, which may contain a spring-loaded winder or bobbin (unshown). The cap portion 236 may be pulled away from the base portion 234, thereby extending the cord 252. Once the cap portion 236 is released, e.g., is no longer being pulled or tensioned, the cord 252 may wind around the winder, thereby pulling the cap portion 236 into the recess 248.

Figure 17:
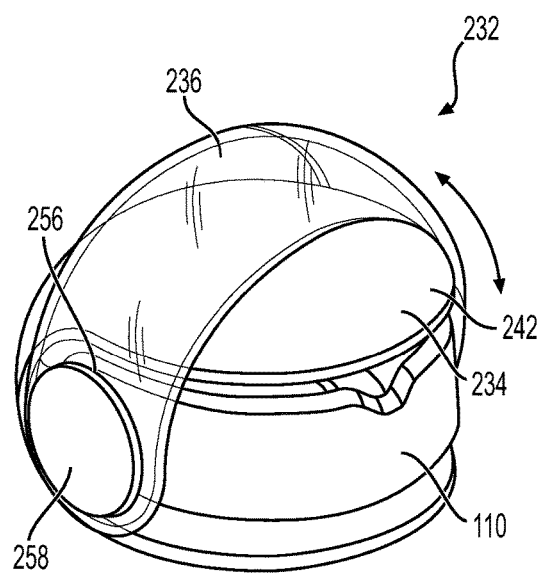
FIG. 17 shows a schematic isometric view of an oral device container according to yet another embodiment of the disclosure.

FIG. 17 shows yet another embodiment of the oral device container 232 configured to hold oral device 110. In this embodiment, the base portion 234 may include a pair of revolute joint mounts 256. The cap portion 236 has a connector 258, which may be in the form of a pair of pins, with each pin connecting to one of the pair of revolute joint mounts 256. When the cap portion 236 is mounted to the base portion 234, the cap portion 236 may be rotated about the pins so as to open the oral device container 232, as shown in FIG. 17. That is, the cap portion 236 forms a visor that rotates relative to the base portion 234. The pins may also serve as release buttons that, when pressed inward toward a center of the oral device container 232, release the cap portion 236, e.g., permit the cap portion 236 to rotate. In this embodiment, the top portion 242 may be shaped to permit clearance between the base portion 234 and the cap portion 236 when the cap portion 236 rotates.

FIG. 18A shows an oral device container 262 according to still another embodiment. The oral device container 262 has a base portion 264 and a cap portion 266. The base portion 264 and the cap portion 266 may be formed of polycarbonate, for example. The material that forms the base portion 264 and the cap portion 266 is not, however, limited to this material, and it is contemplated that base portion 264 and cap portion 266 may be formed of a variety of materials, and base portion 264 and cap portion 266 may be formed of the same or different materials. The base portion 264 includes a bottom portion 268, a side wall 270 that extends from one side of the bottom portion 268, and a top portion 272 that is slidably mounted to the side wall 270. The top portion 272 may have a groove or recess 274 (shown in a dashed line) on a bottom surface thereof, and the side wall 270 may have a protrusion 276 (shown in a dashed-dotted line) on an upper surface thereof, or vice versa. The top portion 272 may slide relative to the side wall 270 as the recess slides along the protrusion. In FIG. 18A, the top portion 272 is shown in an open state. FIG. 19 shows the top portion 272 of the oral device container 262 in a closed state. In the closed state, the bottom portion 268, the side wall 270, and the top portion 272 define a ring-shaped recess around which the cap portion 266 is positioned. That is, the cap portion 266 has a complementary ring-shape to fit around the ring-shaped recess of the base portion 264. Alternatively, as shown in FIG. 18B, the top portion 272 may be rotatably mounted to the side wall 270. The top portion 272 may contain a hinge connector 278 that attaches to a corresponding connector 280 in the side wall 270, allowing the top portion 272 to rotate relative to the base portion 264. One or more magnets 282 may be provided on the top portion 272 and on the side wall 270. The magnets 282 may have a configuration such that magnets in the top portion 272 and magnets in the side wall 270 align when the top portion 272 is in a closed state and when the top portion 272 is in an open state, such that the top portion 272 is held in position when in the closed state and when in the open state, respectively. While the magnets 282 may have an attraction strength that is sufficient for holding the top portion 272 in position relative to base portion 264, the attraction strength of the magnets 282 is also sufficiently mild so as to allow a user to overcome the strength of magnetic attraction to rotate the top portion 272 relative to the base portion 264, e.g., with one hand.

Figure 20:
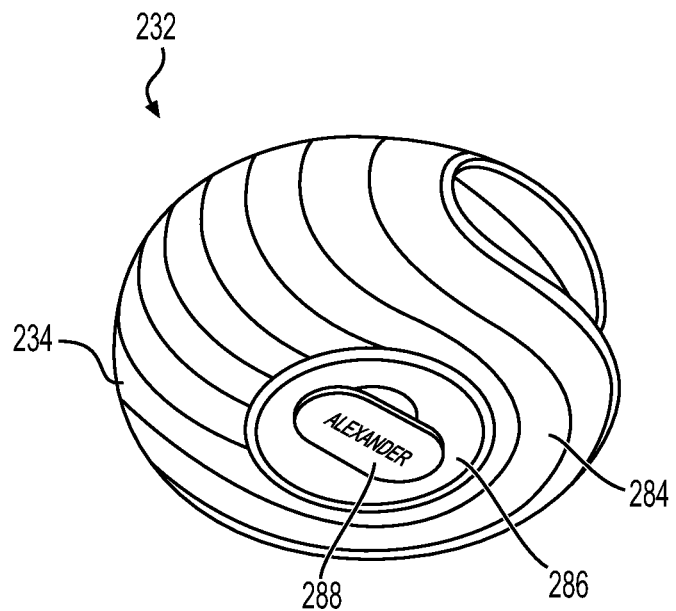
FIG. 20 shows a schematic isometric view of a mounting portion of an oral device container.

FIG. 20 shows a schematic isometric view of a mounting portion that may be included in or on an oral device container, such as the oral device container 232 shown in one of FIGS. 14-17. The base portion 234 of the oral device container 232 has a bottom surface 284 with a recess 286 at a center thereof, and a protrusion 288 extending from the recess 286. The protrusion 288 may be shaped as an obround, although the shape of the protrusion 288 is not so limited, and other shapes, such as a T-bar may be used. The protrusion 288 may have customized indicia, for example, engraved or molded into a surface of the protrusion 288, or added using a decal or printing. The customized indicia may include a name, a phone number, a jersey number, a team name, or any other identification data of a user, or any other data deemed desirable or necessary. As shown in FIG. 20, the oral device container 232 may include a design or surface texture if deemed desirable or necessary.

Figure 21:
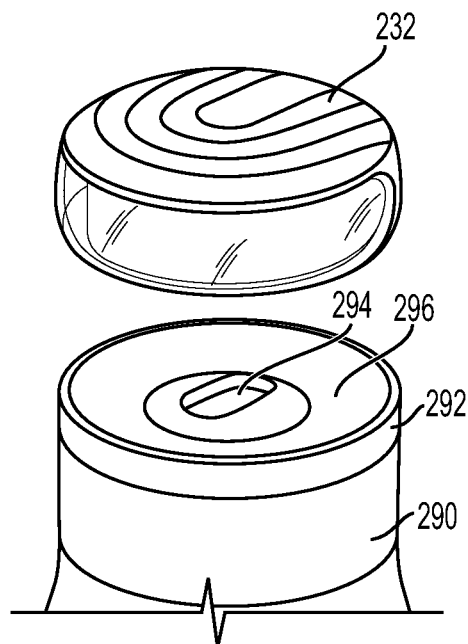
FIG. 21 shows a schematic isometric view of a mounting portion of a bottle configured to attach to the mounting portion of the oral device container shown in FIG. 20.

FIG. 21 shows a schematic detail view of a mounting portion of a bottle 290 to which the oral device container 232 can be mounted. The bottle 290 has a cap portion 292 having a recess 294 on an upper surface 296 thereof. The recess 294 is shaped and sized so as to receive the protrusion 288 on the bottom surface 284 of the base portion of the oral device container 232. In the embodiment shown in FIG. 21, the recess 294, similarly to the protrusion 288, is an obround. The shape of the recess 294 is not, however, limited to the obround, and may be any shape that corresponds to a shape of the protrusion 288. When the protrusion 288 of the oral device container 232 is inserted into the recess 294 on the bottle 290, and rotated by 90°, i.e., a quarter turn, the oral device container 232 becomes interlocked with the bottle 290. The interlocking of the protrusion 288 and the recess 294 may also be used on the oral device container 232, shown in FIGS. 18A, 18B, and 19.

Figure 22:
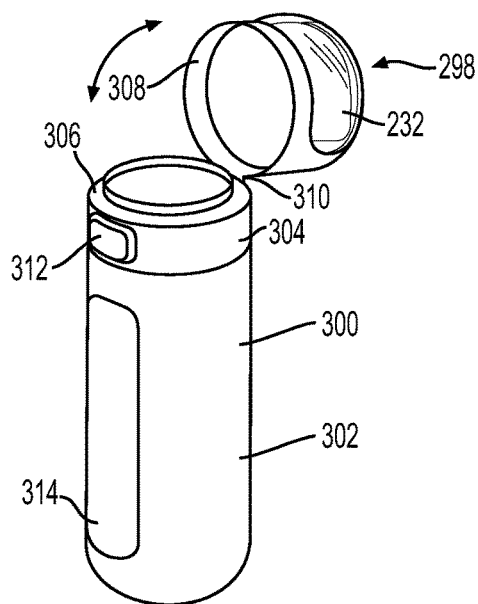
FIG. 22 shows a schematic isometric view of an oral device container and bottle assembly according to another embodiment of the disclosure.

FIG. 22 shows a schematic isometric view of an oral device container and bottle assembly 298 according to another embodiment. The oral device container and bottle assembly 298 may include, for example, the oral device container 232 shown in one of FIGS. 14-17. The oral device container and bottle assembly 298 may alternatively include, for example, the oral device container 262 shown in FIGS. 18A, 18B, and 19, however, in the description below, reference is made to the oral device container 232 shown in one of FIGS. 14-17. The oral device container and bottle assembly 298 also includes a bottle 300 having a base portion 302 and a cap portion 304. The base portion 302 and the cap portion 304 may be formed of polycarbonate, for example. The material that forms the base portion 302 and the cap portion 304 is not, however, limited to this material, and it is contemplated that base portion 302 and cap portion 304 may be formed of a variety of materials, and base portion 302 and cap portion 304 may be formed of the same or different materials.

The cap portion 304 may include a connection portion 306 that connects to the base portion 302 of the bottle 300, and a hinged top portion 308, connected to the connection portion 306 by a hinge 310. The hinged top portion 308 is configured to rotate about the hinge 310 to open and close, as shown by the arrow in FIG. 22, to permit opening of the bottle 300 for drinking. The hinged top portion 308 may be released from a closed position when a button 312 on the connection portion 306 is pressed. That is, when the button 312 is pressed inward into the connection portion 306, the button 312 may release the hinged top portion 308. The base portion 302 of the bottle 300 may also include a window 314, which can be used to discern an amount of liquid or other material that remains in the bottle 300.

The oral device container 232 can remain attached to the top portion 308 of the bottle 300, as shown, when the top portion 308 is in an open state. The oral device container 232 may be attached to the top portion 308 of the bottle 300 by, for example, a protrusion provided on the oral device container 232, such as the protrusion 288 shown in FIG. 20, and a recess provided on the top portion 308 of the bottle 300, such as the recess 294 shown in FIG. 21. Alternatively, the oral device container 232 may have a recess, and the top portion 308 of the bottle 300 may have a corresponding protrusion configured to be inserted and rotated within the recess in the oral device container 232 to thereby secure the oral device container 232 to the bottle 300.

Figure 23:
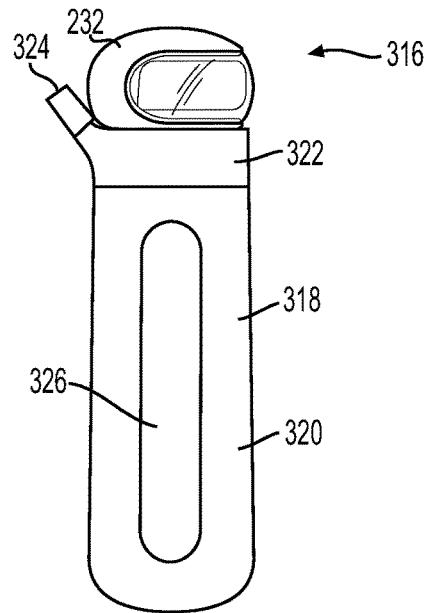
FIG. 23 shows a schematic isometric view of an oral device container and bottle assembly according to still another embodiment of the disclosure.

FIG. 23 shows a schematic isometric view of an oral device container and bottle assembly 316 according to another embodiment. The oral device container and bottle assembly 316 may include, for example, the oral device container 232 shown in one of FIGS. 14-17. The oral device container and bottle assembly 316 may alternatively include, for example, the oral device container 262 shown in FIGS. 18A, 18B, and 19, however, in the description below, reference is made to the oral device container 232 shown in one of FIGS. 14-17. The oral device container and bottle assembly 316 also includes a bottle 318 having a base portion 320 and a cap portion 322. The base portion 320 and the cap portion 322 may be formed of polycarbonate, for example. The material that forms the base portion 320 and the cap portion 322 is not, however, limited to this material, and it is contemplated that base portion 320 and cap portion 322 may be formed of a variety of materials, and base portion 320 and cap portion 322 may be formed of the same or different materials. The cap portion 322 may include a straw portion 324 that extends at an angle and from a side of the cap portion 322, as shown in FIG. 23, so as to permit attachment of the oral device container 232 while providing access for drinking. The straw portion 324 may be a bite and sip style straw, and may be formed of TPE or silicone, such as food safe TPE or food safe silicone. The material that forms the straw portion 324 is not, however, limited to such materials. The cap portion 322 may be removably attached to the base portion 320 of the bottle 318 for refilling and cleaning of the bottle 318. For example, the cap portion 322 may be threadably attached to the base portion 320, and may be removed by unscrewing the cap portion 322. When the cap portion 322 is removed from the base portion 320, the oral device container 232 may remain attached to the cap portion 322. The base portion 320 of the bottle 318 may also include a window 326, which can be used to discern an amount of liquid that remains in the bottle 318.

The oral device container 232 may be attached to the cap portion 322 of the bottle 318 by, for example, a protrusion provided on the oral device container 232, such as the protrusion 288 shown in FIG. 20, and a recess provided on the cap portion 322 of the bottle 318, such as the recess 294 shown in FIG. 21. Alternatively, the oral device container 232 may have a recess, and the cap portion 322 of the bottle 318 may have a corresponding protrusion configured to be inserted and rotated within the recess in the oral device container 232 to thereby secure the oral device container 232 to the bottle 318. Alternatively, the corresponding protrusion on the cap portion 322 of the bottle 318 may be configured to slide within the recess in the oral device container 232, which permits the oral device container 232 to slide relative to the bottle 318.

Figure 24:
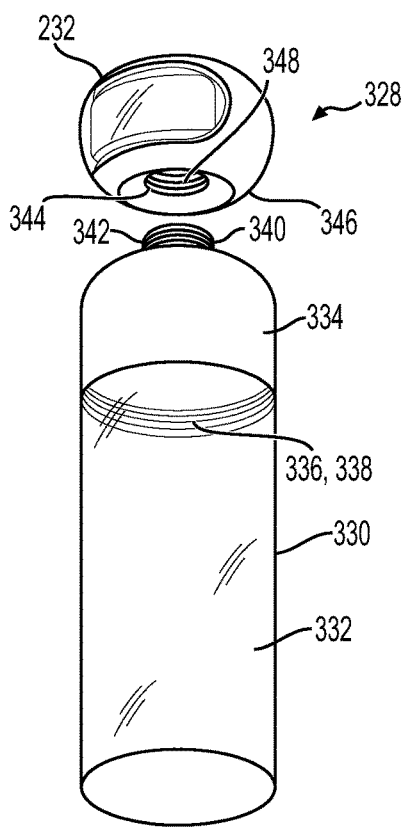
FIG. 24 shows a schematic isometric view of an oral device container and bottle assembly, with the oral device container in a detached state, according to another embodiment of the disclosure.

FIG. 24 shows a schematic isometric view of an oral device container and bottle assembly 328 according to another embodiment. The oral device container and bottle assembly 328 may include, for example, the oral device container 232 shown in one of FIGS. 14-17. The oral device container and bottle assembly 328 may alternatively include, for example, the oral device container 262 shown in FIGS. 18A, 18B, and 19, however, in the description below, reference is made to the oral device container 232 shown in one of FIGS. 14-17. The oral device container and bottle assembly 328 also includes a bottle 330 having a base portion 332 and a cap portion 334. The base portion 332 and the cap portion 334 may be formed of polycarbonate, for example. The material that forms the base portion 332 and the cap portion 334 is not, however, limited to this material. The cap portion 334 may include a plurality of threads 336 on an inner surface of a lower end thereof. The base portion 332 may include a corresponding plurality of threads 338 on an outer surface at an upper end thereof. The plurality of threads 336 of the cap portion 334 are configured to engage with the plurality of threads 338 of the base portion 332 to connect the cap portion 334 and the base portion 332. That is, the cap portion 334 may be threadably coupled to the base portion 332. Removal of the cap portion 334 allows for cleaning of the bottle 330, and for packaging of informational material, such as care information, warranty information, and the like, within the bottle 330.

The cap portion 334 may also include a narrowed opening 340 at an upper end thereof, having one or a plurality of threads 342 on an outer surface thereof. The oral device container 232 may include an opening 344 on a bottom surface 346 thereof, the opening 344 including one or a plurality of threads 348. The plurality of threads 342 on the outer surface of the narrowed opening 340 of the cap portion 334 are configured to engage with the plurality of threads 348 in the opening 344 of the oral device container 232 to secure the oral device container 232 to the bottle 330. That is, the oral device container 232 is configured to be threadably coupled to the cap portion 334. By removing the oral device container 232 from the cap portion 334 (e.g., but unscrewing the oral device container 232 from the cap portion 334), the bottle 330 can be used for drinking. That is, the oral device container 232 in this embodiment serves as a cap to the bottle 330.

Figure 25:
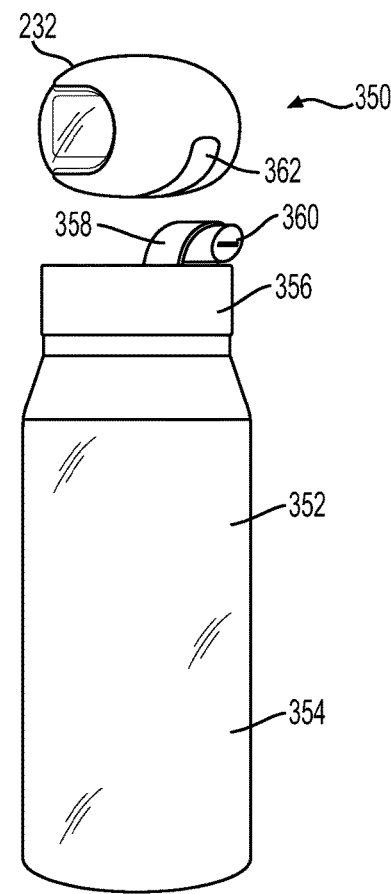
FIG. 25 shows a schematic isometric view of an oral device container and bottle assembly, with the oral deice container in a detached state, according to another embodiment of the disclosure.

FIG. 25 shows a schematic isometric view of an oral device container and bottle assembly 350 according to another embodiment. The oral device container and bottle assembly 350 may include, for example, the oral device container 232 shown in one of FIGS. 14-17. The oral device container and bottle assembly 350 may alternatively include, for example, the oral device container 262 shown in FIGS. 18A, 18B, and 19, however, in the description below, reference is made to the oral device container 232 shown in one of FIGS. 14-17. The oral device container and bottle assembly 350 also includes a bottle 352 having a base portion 354 and a cap portion 356. The base portion 354 and the cap portion 356 may be formed of polycarbonate, for example. The material that forms the base portion 354 and the cap portion 356 is not, however, limited to this material. The cap portion 356 may be attached to the base portion 354 in any appropriate manner, such as, for example, by one or a plurality of threads (unshown) on the cap portion 356 engaging with one or a plurality of threads (unshown) on the base portion 354, similar to the embodiment shown in FIG. 24. The cap portion 356 may include a spout 358 extending from an upper surface toward a side thereof, as shown in FIG. 25, with a straw 360 extending through the spout 358. In this example, the oral device container 232 has a recess 362 on a bottom surface thereof. The recess 362 corresponds in shape and size to the spout 358 of the cap portion 356. In this embodiment, the oral device container 232 is configured to slide onto the cap portion 356, so that the spout 358 is received within the recess 362. That is, the oral device container 232 straddles and fits on the spout 358 when mounted to the cap portion 356. The oral device container and bottle assembly 350 of this embodiment provides for access for drinking without requiring removal of the oral device container 232.

Figure 26:
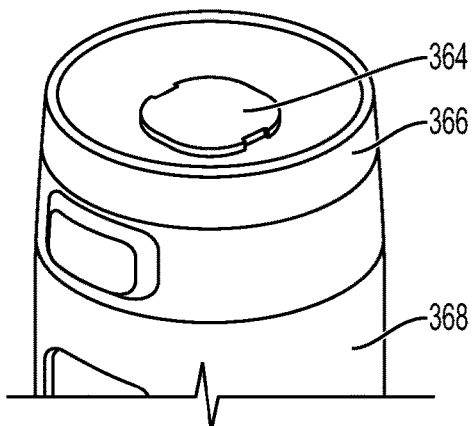
FIG. 26 shows a schematic detail view of a connection mechanism on a cap portion of a bottle, according to an embodiment of the disclosure.
Figure 27:
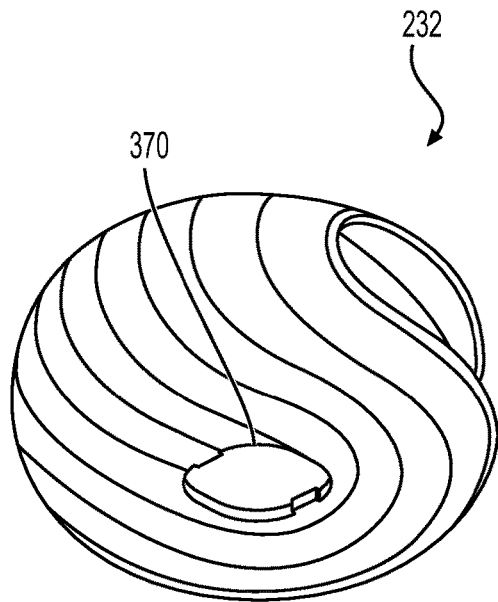
FIG. 27 shows a schematic isometric view of a connection mechanism on an oral device container corresponding to the connection mechanism shown in FIG. 26.

FIG. 26 shows a schematic detail view of a connection protrusion 364 on a cap portion 366 of a bottle 368, according to an embodiment. The connection protrusion 364 may be generally square with rounded corners and indents on two opposing sides, as shown in FIG. 26. FIG. 27 shows a schematic isometric view of a corresponding connection recess 370 on an oral device container, such as the oral device container 232 shown in any one of FIGS. 14-17. The connection recess 370 has a corresponding shape to the connection protrusion 364 shown in FIG. 26. The connection protrusion 364 is configured to be inserted into the connection recess 370, and secured by a rotation in a first direction (e.g., a clock-wise direction) of 90°.

Figure 28:
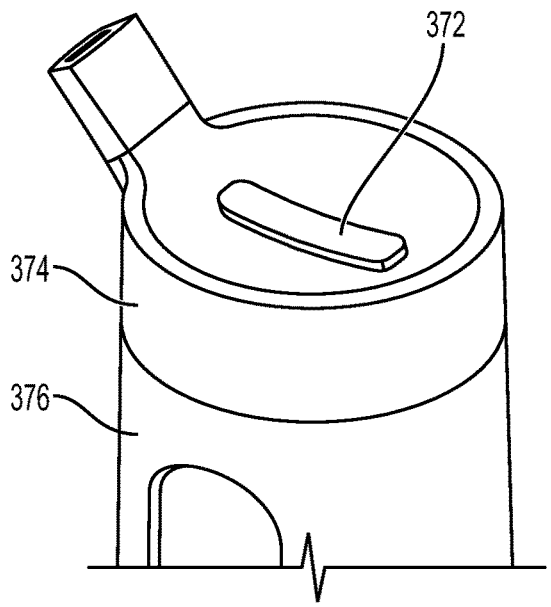
FIG. 28 shows a schematic detail view of a connection mechanism on a cap portion of a bottle, according to another embodiment of the disclosure.
Figure 29:
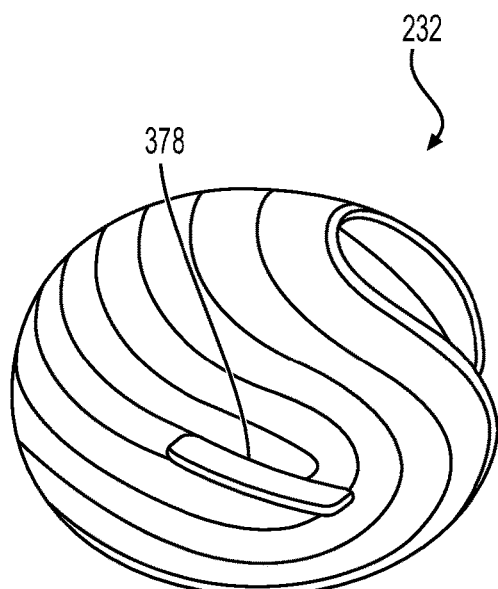
FIG. 29 shows a schematic isometric view of a connection mechanism on an oral device container corresponding to the connection mechanism shown in FIG. 28.

FIG. 28 shows a schematic detail view of a connection protrusion 372 on a cap portion 374 of a bottle 376, according to another embodiment. The connection protrusion 372 may be rectangular with rounded corners, as shown in FIG. 28. FIG. 29 shows a schematic isometric view of a connection recess 378 on an oral device container, such as the oral device container 232 shown in any one of FIGS. 14-17. The connection recess 378 has a corresponding shape to the connection protrusion 372 shown in FIG. 28. The connection protrusion 372 is configured to be inserted into the connection recess 378 at one end thereof, and the oral device container 232 slides on the cap portion 374 as the connection protrusion 372 slides into the connection recess 378.

Figure 30:
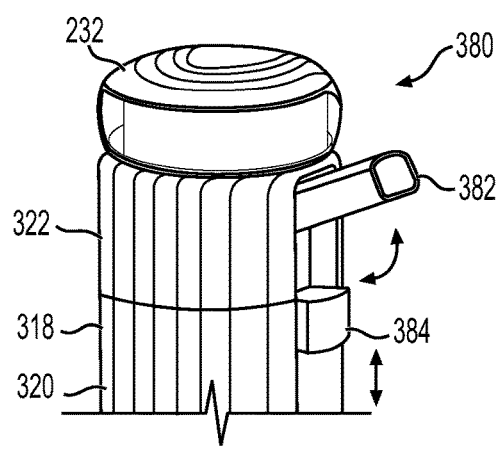
FIG. 30 shows a schematic isometric view of a top portion of an oral device container and bottle assembly according to another embodiment of the disclosure.
Figure 31:
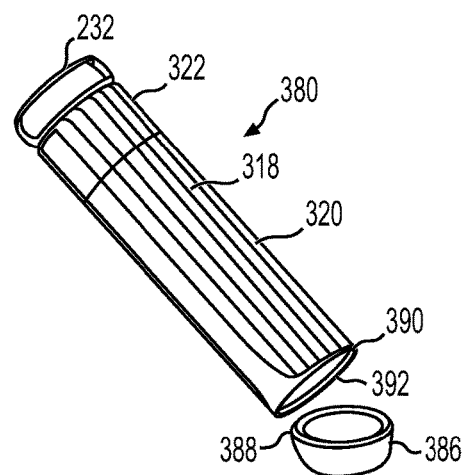
FIG. 31 shows a schematic isometric view of the oral device container shown in FIG. 30, with a bottom compartment, according to another embodiment of the disclosure.

FIG. 30 shows a schematic isometric view of a top portion of an oral device container and bottle assembly 380 according to another embodiment. FIG. 31 shows a schematic isometric view of the oral device container and bottle assembly 380 shown in FIG. 30. The oral device container and bottle assembly 380 may include, for example, the oral device container 232 shown in one of FIGS. 14-17. The oral device container and bottle assembly 380 may alternatively include, for example, the oral device container 262 shown in FIGS. 18A, 18B, and 19, however, in the description below, reference is made to the oral device container 232 shown in one of FIGS. 14-17. The oral device container and bottle assembly 380 is similar to the assembly 316 shown in FIG. 23, but differs in that the cap portion 322 of the bottle 318 includes a straw portion 382 provided on a side of the cap portion 322, and the base portion 320 includes a latch portion 384 on a side thereof, aligned with and configured to engage the straw portion 382 on the cap portion 322 when in a closed position. The straw portion 382 is rotatably attached to the cap portion 322, and rotates between a closed or stored position, in which the latch portion 384 on the base portion 320 engages the straw portion 382, to retain straw portion 382 within an opening of cap portion 322 and an open position, in which the straw portion 382 is released and allowed to rotate outward to the position shown in FIG. 30. In this embodiment, a hinge (unshown) on which the straw portion 382 rotates may include a spring (unshown) that biases the straw portion toward the open position. The latch portion 384 may be configured to slide within a slot (unshown) on the base portion 320 of the bottle 318. When the latch portion 384 is slid downward in the slot, the straw portion 382 may disengage from latch portion 384 and be released from the closed position to the open position. FIG. 30 includes arrows indicating rotation of straw portion 382 and latch portion 384. A spring (unshown) may be provided in the slot to bias the latch portion 384 upward in some aspects, or, a user may rotate straw portion 382 upward while latch portion 384 is slid downward.

The oral device container and bottle assembly 380 also differs from the assembly 316 shown in FIG. 23 in that the base portion 320 of the bottle 318 may also include a bottom compartment 386, shown in FIG. 31. The bottom compartment 386 may be removably attached to the base portion 320 of the bottle 318, and is shown in FIG. 31 in a removed or detached state. The bottom compartment 386 may include a plurality of threads 388 on an upper, exterior surface thereof, configured to engage with a plurality of threads 390 in an opening 392 on a bottom surface of the base portion 320 of the bottle 318. The bottom compartment 386 may be used as additional storage, e.g., for keys, a key fob, money, etc.

Figure 32:
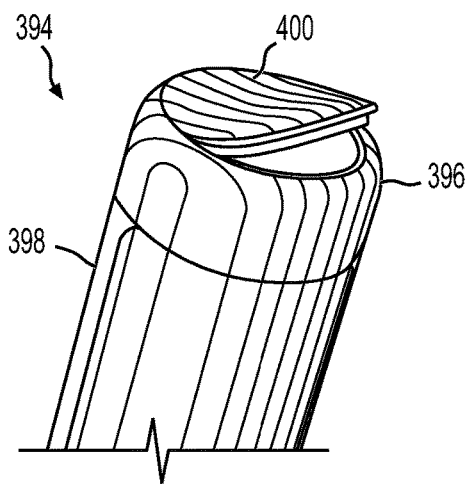
FIG. 32 shows a schematic isometric view of a top portion of an oral device container and bottle assembly according to yet another embodiment of the disclosure.
Figure 33:
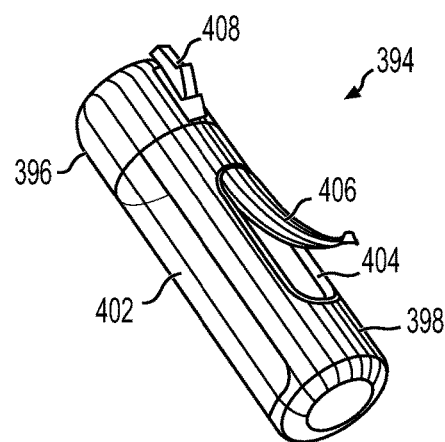
FIG. 33 shows a schematic isometric view of the oral device container shown in FIG. 32, with a side compartment, according to another embodiment of the disclosure.
Figure 36A:
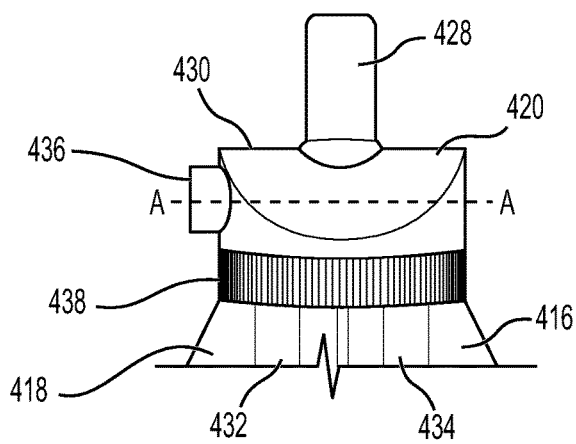
FIGS. 36A and 36B are schematic detail views of a single cap mouthpiece of the oral device container and bottle assembly shown in FIGS. 34 and 35.
Figure 36B:
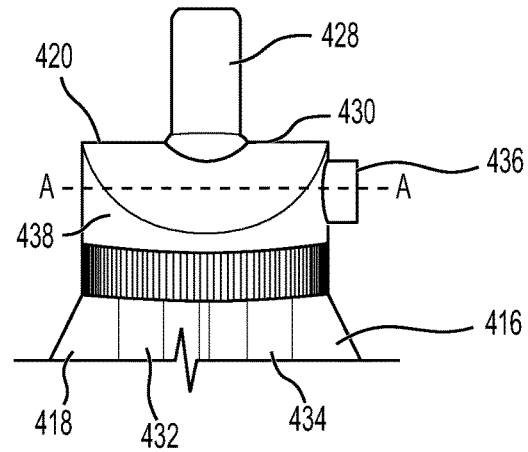

FIG. 32 shows a schematic isometric view of a top portion of an oral device container and bottle assembly 394 according to yet another embodiment. The oral device container and bottle assembly 394 may include a cap portion 396 and a bottle portion 398. In this embodiment, the cap portion 396 may be an oral device container, and may have a flexible upper portion 400 configured to bend and thereby open, so that a user can store an oral device 110, such as a mouthguard, therein. FIG. 33 shows a schematic isometric view of the oral device container and bottle assembly 394 shown in FIG. 32. The bottle portion 398 includes a window portion 402 formed of a translucent material, so as to allow a user to easily see, for example, an amount of fluid contained within the bottle portion 398. In addition, the bottle portion 398 includes a side compartment 404, sealed by a flap 406, and configured to store items, such as money, keys, or key fobs, for example. The flap 406 is formed of a flexible material, such as silicone, and is configured to seal the side compartment 404 and to bend, to thereby open the side compartment. In addition, the cap portion 396 includes a straw portion 408 rotatably mounted to a side thereof. The straw portion 408 is configured to rotate between a stored or closed position, in which the straw portion 408 is folded up against the cap portion 396, and an open position, in which the straw portion extends outward from the cap portion 396, allowing a user to drink from the straw portion 408. The straw portion 408 may be rotatably attached to the cap portion 396 using a hinge (unshown).

FIG. 34 is a schematic isometric view of an oral device container and bottle assembly 410 according to still another embodiment. The oral device container and bottle assembly 410 includes an oral device container 412 and a bottle 414. The bottle 414 may include two bottle portions 416 and 418, configured to contain a fluid, such as water, and a cap portion 420 mounted to the top of the two bottle portions 416 and 418. When the two bottle portions 416 and 418 are mounted to the cap portion 420, the cap portion 420 joins the two bottle portions 416 and 418 together. The two bottle portions 416 and 418 may be attached to the cap portion 420 by a snap fit or an interference fit, for example. Other means of attachment between the two bottle portions 416 and 418 and the cap portion 420 may, however, be used. And, as discussed in more detail below, the fluid contained in one or both of the two bottle portions 416 and 418 is configured to pass through the cap portion 420.

The oral device container 412 is configured to attach to bottom surfaces of the two bottle portions 416 and 418, by, for example, a snap fit or an interference fit. Other means of attachment between the two bottle portions 416 and 418 and the oral device container 412 may, however, be used. The oral device container includes a top portion 422 and a bottom, or receptacle, portion 424. As shown in FIG. 35, the receptacle portion 424 may be configured to slide or rotate relative to the top portion 422, thereby allowing a user to retrieve an item, like an oral device 110, from the receptacle portion 424. The receptacle portion 424 may be formed, at least in part, by a translucent material, so that a user can see the contents of the receptacle portion 424, if any. FIG. 35 also shows a button 426, as a part of a latch mechanism. When the receptacle portion 424 is in a closed state, shown in FIG. 34, the latch mechanism may retain the receptacle portion 424 in the closed state until the button 426 is pressed inward (that is, toward a center of the oral device container 412) and/or slid. When the button 426 is pressed inward and/or slid, the latch mechanism may release the receptacle portion 424, thereby allowing the receptacle portion 424 to slide or rotate away from the top portion 422, and into an open state, as shown in FIG. 35. The receptacle portion 424 may be slidably or rotatably attached to the top portion 422 in a similar manner to the connection between the base portion 264 and the cap portion 266 of the oral device container 262 shown in FIG. 18A. Alternatively, the receptacle portion 424 may be rotatably attached to the top portion 422 in a similar manner to the connection between the base portion 264 and the cap portion 266 of the oral device container 262 shown in FIG. 18B.

With reference to FIGS. 34-37, the cap portion 420 will be described in more detail. As noted above, the cap portion 420 is attached to the two bottle portions 416 and 418 by a snap fit or an interference fit, for example. The cap portion 420 may include an outer straw portion 428 extending through an upper surface 430 of the cap portion 420, and two inner straw portions 432 and 434 extending from a bottom of the cap portion 420, with each inner straw portion 432 and 434 extending into one of the two bottle portions 418 and 416 and, respectively, as shown in FIG. 34. The cap portion 420 may also include a switch portion 436, or a valve, extending horizontally through a body 438 of the cap portion 420. The switch portion 436 is configured to slide along a horizontal axis A-A extending through the body 438 of the cap portion 420, thereby optionally switching between supply of fluid from one of the inner straw portions 432 and 434 and the other one of the inner straw portions 432 and 434, as shown in FIGS. 36A and 36B. That is, the switch portion 436 may be in a left-most position, shown in FIG. 36A, in which fluid contained in the bottle portion 418 is configured to flow through inner straw portion 432, through the cap portion 420, to the outer straw portion 428, or a right-most position, shown in FIG. 36B, in which fluid contained in the bottle portion 416 is configured to flow through inner straw portion 434, through the cap portion 420, to the outer straw portion 428.

Figure 37:
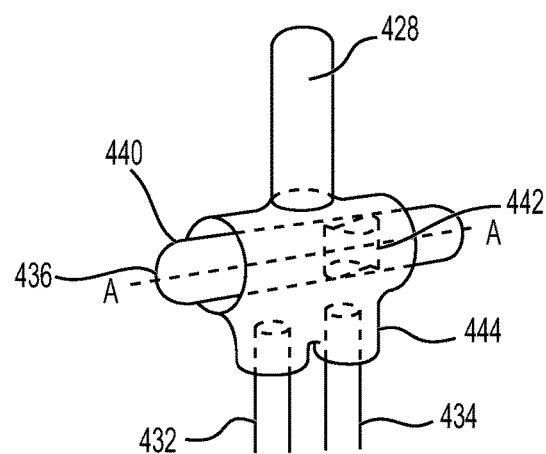
FIG. 37 is a schematic diagram of a mechanism for the single cap mouthpiece shown in FIGS. 36A and 36B.

As shown in FIG. 37, the switch portion 436 may include a rod-shaped body 440, with a through-hole 442 extending through the rod-shaped body 440. A switch adapter 444 sits within the body 438 (FIGS. 36A and 36B) of the cap portion 420. The switch portion 436 slides horizontally along the axis A-A in the switch adapter 444, between the two positions described above with respect to FIGS. 36A and 36B. In addition or alternatively, the switch portion 436 may be configured to be positioned in a central position, between the left-most position and the right-most position, thereby prohibiting fluid from flowing through either of the two inner straw portions 432 and 434. The central position of the switch portion 436 may be useful, for example, during transport of the oral device container and bottle assembly 410, when the assembly 410 may not necessarily be in an upright position, to thereby prevent leakage of the fluid from either of the bottle portions 416 and 418. The materials used to form one or more portions of the oral device container and bottle assembly 410, such as the oral device container 412 or the bottle portion 414, may be, for example, polycarbonate. The materials used to form the outer straw portion 428 and the inner straw portions 432 and 434 may be, for example, silicone. The materials used to form the various portions of the assembly 410 are not, however, limited to polycarbonate and silicone, and other materials may be used.

Figure 38:
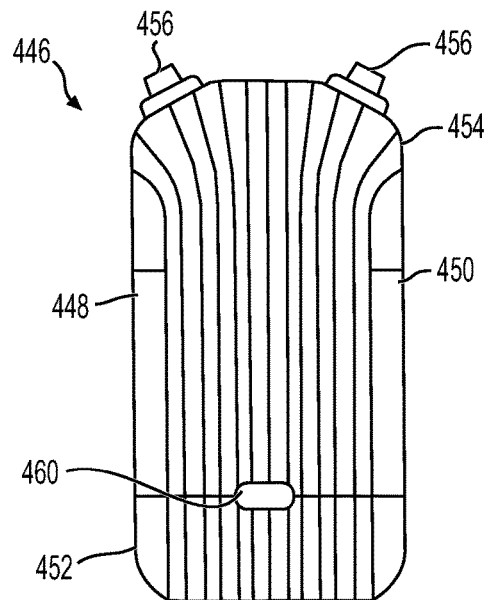
FIG. 38 is a schematic side view of an oral device container and bottle assembly according to another embodiment of the disclosure.

FIG. 38 is a schematic side view of an oral device container and bottle assembly 446 according to another embodiment. The oral device container and bottle assembly 446 may include two bottle portions 448 and 450, as well as an oral device container 452. One or more of the two bottle portions 448 and 450 and the oral device container 452 may be formed of a translucent material, so that a user can see the contents of the respective portions of the assembly 446. The assembly 446 may also include a jacket or a sleeve 454 configured to retain or hold together the two bottle portions 448 and 450 and the oral device container 452.

Figure 39:
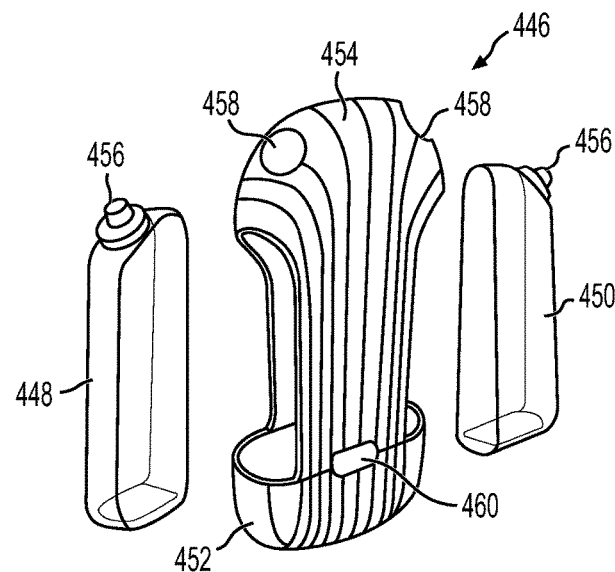
FIG. 39 is a schematic exploded view of the oral device container and bottle assembly shown in FIG. 38.

FIG. 39 is a schematic exploded view of the oral device container and bottle assembly 446 shown in FIG. 38. The two bottle portions 448 and 450 are shown separated from the sleeve 454, while the oral device container 452 is shown within the sleeve 454. Each of the two bottle portions 448 and 450 may include a cap 456 configured to secure an opening in a top region of the respective bottle portions 448 and 450, and configured to allow fluid contained within the respective bottle portions 448 and 450 to flow through the respective cap 456. As shown in FIG. 38, each cap 456 is configured to extend through an opening 458 (shown in FIG. 39) in the sleeve 454 when the two bottle portions 448 and 450 are contained within the sleeve 454.

Figure 40:
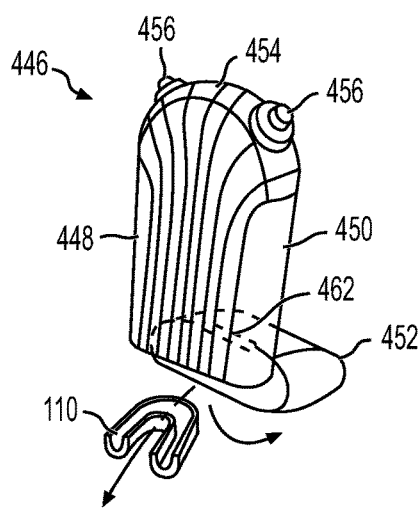
FIG. 40 is a schematic isometric view of the oral device container and bottle assembly shown in FIGS. 38 and 39, with the oral device container in an open state.

FIG. 38 also shows the oral device container 452 in a closed state, with a button 460, as a part of a latch mechanism, maintaining the oral device container 452 in the closed state. FIG. 40 is a schematic isometric view of the oral device container and bottle assembly 446 shown in FIGS. 38 and 39. In FIG. 40, the oral device container 452 is shown in an open state. The oral device container 452 switches from the closed state to the open state when the button 460 is pressed inward (that is, toward a center of the oral device container 452) and/or slid, which releases a latch holding the oral device container 452 in the closed state. As shown in FIG. 40, upon release of the latch, the oral device container 452 rotates to the open state, allowing a user to access the contents of the oral device container 452, such as the oral device 110. The oral device container 452 may be attached to the sleeve 454 by a hinge 462, as shown in FIG. 40. In other aspects, oral device container 452 may completely detach from sleeve 454 when button 460 is pressed or slid, or may rotate or slide relative to sleeve 454, e.g., in a similar manner as described in reference to, e.g., FIGS. 11-13, 31, 34, and 35.

Figure 41:
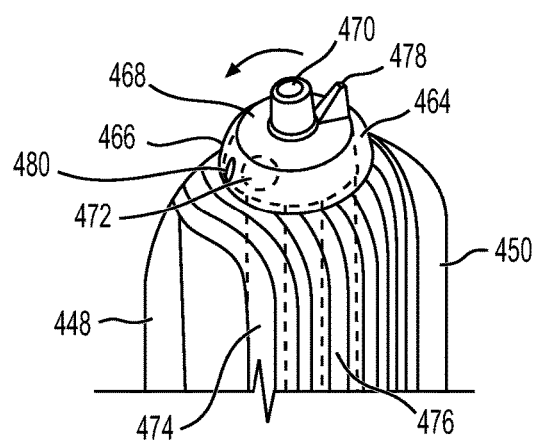
FIG. 41 is a schematic detail view of an alternative cap portion of the oral device container and bottle assembly shown in FIGS. 38-40.

FIG. 41 is a schematic detail view of an alternative cap portion 464 of the oral device container and bottle assembly 446 shown in FIGS. 38-40. The cap portion 464 of this embodiment has a body 466, a dial 468, and an external straw portion 470. The dial 468 is configured to rotate relative to the body 466 and the external straw portion 470. The dial 468 includes an opening 472 on a bottom surface thereof, configured to correspond in size to internal straw portions 474 and 476, contained within the two bottle portions 448 and 450, respectively. The dial 468 may also include a protruded portion 478 for ease of rotating the dial 468, and an indicator opening 480 on a side thereof, to indicate a position of the opening 472 (that is, to indicate an alignment between the opening 472 and one of the two internal straw portions 474 or 476). By virtue of this embodiment, the cap portion 464 allows a user to switch between supply of fluid from one of the two bottle portions 448 or 450. And, in addition or alternatively, the dial 468 may be configured to be positioned in a central position, in which the opening 472 does not align with either of the two internal straw portions 474 or 476, thereby prohibiting fluid from flowing through either of the two inner straw portions 474 and 476. The central position of the dial 468 may be useful, for example, during transport of the oral device container and bottle assembly 446, when the assembly 446 may not necessarily be in an upright position, to thereby prevent leakage of the fluid from either of the bottle portions 448 or 450. The materials used to form one or more portions of the cap portion 464 may be, for example, polycarbonate. The materials used to form the outer straw portion 470 and the inner straw portions 474 and 476 may be, for example, silicone. The materials used to form the various portions of the cap portion 464 are not, however, limited to polycarbonate and silicone, and other materials may be used.

Although the various embodiments described above include protrusions on one of a cap portion of a bottle and an oral device container, and a recess on the other one of the cap portion of the bottle and the oral device container, the arrangement may be reversed (e.g., the protrusions described as being on cap portions can be provided on oral device containers and the recesses described as being on oral device containers can be on cap portions, and the protrusions described as being on oral device containers can be on cap portions, and the recesses described as being on cap portions can be on oral device containers).

The oral device container and bottle assemblies of the present disclosure provide a convenient, easy to access oral device container that can be attached to a bottle. The oral device containers of the present disclosure provide storage for an oral device, such as a mouthguard, that is easy to open and close and easy to find by virtue of being attached to a bottle. In addition, in a closed configuration, an oral device positioned within the oral device container may be prevented from contamination with an external environment. Many of the oral device and bottle assemblies described herein further provide for access to fluid in the bottle for refreshment without requiring removal of the oral device container.

It will be apparent to those skilled in the art that various modifications and variations can be made to the disclosed oral device container and bottle assembly without departing from the scope of the disclosure. Other embodiments of the oral device container and the oral device container and bottle assembly will be apparent to those skilled in the art from consideration of the specification and the accompanying figures. For example, it is understood features described in connection with any one of the above-noted embodiments may be used in connection with any other of the above-noted embodiments. It is intended that the specification, and, in particular, the examples provided herein be considered as exemplary only, with a true scope of the disclosure being indicated by the following claims and their equivalents.

We claim:

1. An oral device container, comprising:
   a bottom portion;
   a top portion;
   a side wall extending between the bottom portion and the top portion defining a gap, wherein the top portion is movably coupled to the side wall via a mechanical connection, wherein in a closed configuration, a magnet of the top portion aligns with a magnet of the side wall in a first orientation, and in an open configuration, the magnet of the top portion aligns with the magnet of the side wall in a second orientation; and
   a cap portion positioned within the gap between the bottom portion and the top portion.

2. The oral device container of claim 1, wherein the mechanical connection is a hinge.

3. The oral device container of claim 1, wherein in a closed configuration, the bottom portion, top portion, and side wall form a ring-shaped recess around which the cap portion extends.

4. The oral device container of claim 1, further including:
   a mounting portion extending from the bottom portion, the mounting portion configured to cooperate with a corresponding mounting portion of a bottle so as to secure the bottom portion to the bottle.

5. An oral device container, comprising:
   a base portion including a bottom portion, a top portion, and a side wall extending between the bottom portion and the top portion, wherein the top portion is movably coupled to the side wall, and in a closed configuration, one or more magnets of the top portion align with one or more magnets of the side wall in a first orientation, and in an open configuration, the one or more magnets of the top portion aligns with the one or more magnets of the side wall in a second orientation; and
   a cap portion coupled to the base portion, the cap portion including a transparent portion, wherein in the closed configuration, the bottom portion, top portion, and side wall form a ring-shaped recess around which the cap portion extends.

6. The oral device container of claim 5, wherein the top portion is rotatably coupled to the side wall via a hinge.

7. The oral device container of claim 5, wherein in a closed configuration, a central axis of the bottom portion is collinear with a central axis of the top portion.

8. The oral device container of claim 5, further including:
   a mounting portion extending from the bottom portion, the mounting portion configured to cooperate with a corresponding mounting portion of a bottle so as to secure the bottom portion to the bottle.

9. The oral device container of claim 5, wherein the top portion is moveably coupled to the side wall via complimentary connectors of the top portion and the side wall.

10. The oral device container of claim 5, wherein in a closed state, the top portion, side wall, bottom portion, and cap collectively define a receiving space sized to receive an oral device therein.

11. The oral device container of claim 10, wherein the transparent portion is positioned so as to provide a line of sight through the cap to the receiving space.

12. An oral device container, comprising:
   a bottom portion;
   a top portion including a first connector and one or more magnets; and
   a side wall extending between the bottom portion and the top portion, the side wall including a second connector and one or more magnets, wherein the top portion is rotatably coupled to the side wall via the first connector and second connector;
   wherein in a closed configuration, the one or more magnets of the top portion align with the one or more magnets of the side wall in a first orientation, and in an open configuration, the one or more magnets of the top portion aligns with the one or more magnets of the side wall in a second orientation, wherein in the closed configuration, the bottom portion, top portion, and side wall form a ring-shaped recess around which a cap portion extends.

13. The oral device container of claim 12, further including:
   a mounting portion extending from the bottom portion, the mounting portion configured to cooperate with a corresponding mounting portion of a bottle so as to secure the bottom portion to the bottle.

14. The oral device container of claim 12, wherein the first connector and the second connector collectively define a hinge.

15. The oral device container of claim 12,
   wherein the cap portion includes a transparent portion, wherein in a closed state, the top portion, side wall, bottom portion, and cap collectively define a receiving space sized to receive an oral device therein, and wherein the transparent portion is positioned so as to provide a line of sight through the cap to the receiving space.

* * * * *